(12) United States Patent
Rahn et al.

(10) Patent No.: US 8,014,686 B2
(45) Date of Patent: Sep. 6, 2011

(54) POLARIZATION DEMULTIPLEXING OPTICAL RECEIVER USING POLARIZATION OVERSAMPLING AND ELECTRONIC POLARIZATION TRACKING

(75) Inventors: Jeffrey Thomas Rahn, Sunnyvale, CA (US); Wei Chen, Ellicott City, MD (US)

(73) Assignee: Infinera Corporation, Sunnyvale, CA (US)

( * ) Notice: Subject to any disclaimer, the term of this patent is extended or adjusted under 35 U.S.C. 154(b) by 597 days.

(21) Appl. No.: 12/052,541

(22) Filed: Mar. 20, 2008

(65) Prior Publication Data

US 2009/0238579 A1 Sep. 24, 2009

(51) Int. Cl.
*H04B 10/06* (2006.01)
(52) U.S. Cl. .......................... 398/205; 398/207; 398/212
(58) Field of Classification Search .......... 398/205–207, 398/212, 214
See application file for complete search history.

(56) References Cited

U.S. PATENT DOCUMENTS

| | | | |
|---|---|---|---|
| 3,971,930 A | 7/1976 | Fitzmaurice et al. | |
| 4,438,530 A | 3/1984 | Steinberger | |
| 5,388,088 A | 2/1995 | Gans et al. | |
| 6,782,211 B1 | 8/2004 | Core | |
| 2004/0114939 A1* | 6/2004 | Taylor | 398/152 |
| 2006/0171718 A1* | 8/2006 | Hoshida | 398/152 |
| 2007/0047954 A1* | 3/2007 | Mamyshev | 398/33 |
| 2007/0065157 A1* | 3/2007 | Katagiri et al. | 398/155 |
| 2007/0201879 A1 | 8/2007 | Liu | |
| 2008/0025733 A1* | 1/2008 | Nazarathy et al. | 398/209 |
| 2008/0031633 A1 | 2/2008 | Hoshida et al. | |
| 2008/0232816 A1* | 9/2008 | Hoshida et al. | 398/152 |

FOREIGN PATENT DOCUMENTS

| | | |
|---|---|---|
| DE | 102006030915 | 1/2008 |
| EP | 1694017 A1 | 8/2006 |

OTHER PUBLICATIONS

Jian Zhao et al. "Maximum Likelihood Sequence Estimation for Chromatic Dispersion and Polarization Mode Dispersion Compensation in 3-Chip DPSK Modulation Format", Optical Society of America, 2007, OMG3.pdf.
D. van den Borne, "DQPSK modulation for robust optical transmission", Optical Society of America, 2008, OFC/NFOEC 2008.
Mark T. Core, "Cross Polarization Interference Cancellation for Fiber Optic Systems", Journal of Lightwave Technology, vol. 24, No. 1, Jan. 2006, pp. 305-311.
S. Calabro et al., "An electrical polarization-state controller and demultiplexer for polarization multiplexed optical signals", Proc. 30th ECOC, Rimini, Italy,2004, vol. 4, pp. 950-951.
Xiang Liu et al., "Direct Detection of 107-Gb/s Polarization-Multiplexed DQPSK with Electronic Polarization Demultiplexing", Optical Society of America, 2008, OFC/NFOEC 2008.
Han Sun et al., "Real-time measurements of a 40 Gb/s coherent system", Optics Express, vol. 16, Issue 2, 2008, pp. 873-879.
International Preliminary Report on Patentability in International Application No. PCT/US2009/037888.
International Search Report in International Application No. PCT/US2009/037888.

* cited by examiner

*Primary Examiner* — Dzung D Tran
(74) *Attorney, Agent, or Firm* — Harrity & Harrity, LLP; David L. Soltz

(57) ABSTRACT

An optical receiver utilizes differential quadrature phase-shift keying (DQPSK) demodulation and electrical crosstalk rejection to relax requirements on filter misalignment with a carrier signal and to enable electronic polarization demultiplexing of optical signals. The optical receiver uses additional polarization state information when performing differential phase measurements on the optical signals. This provides information that ensures that data can be recovered by the optical receiver regardless of the state of polarization introduced during transmission of the optical signals. The optical receiver over samples the optical signals, which enables electrical polarization demultiplexing of the optical signals. The electrical crosstalk rejection provides a tracking algorithm that isolates received optical signals, and reduces crosstalk between data sequences.

25 Claims, 13 Drawing Sheets

CONSTELLATION DIAGRAM FROM I AND Q SIGNALS BEFORE MIMO PROCESSING (930)

CONSTELLATION DIAGRAM FROM I AND Q SIGNALS AFTER MIMO PROCESSING (940)

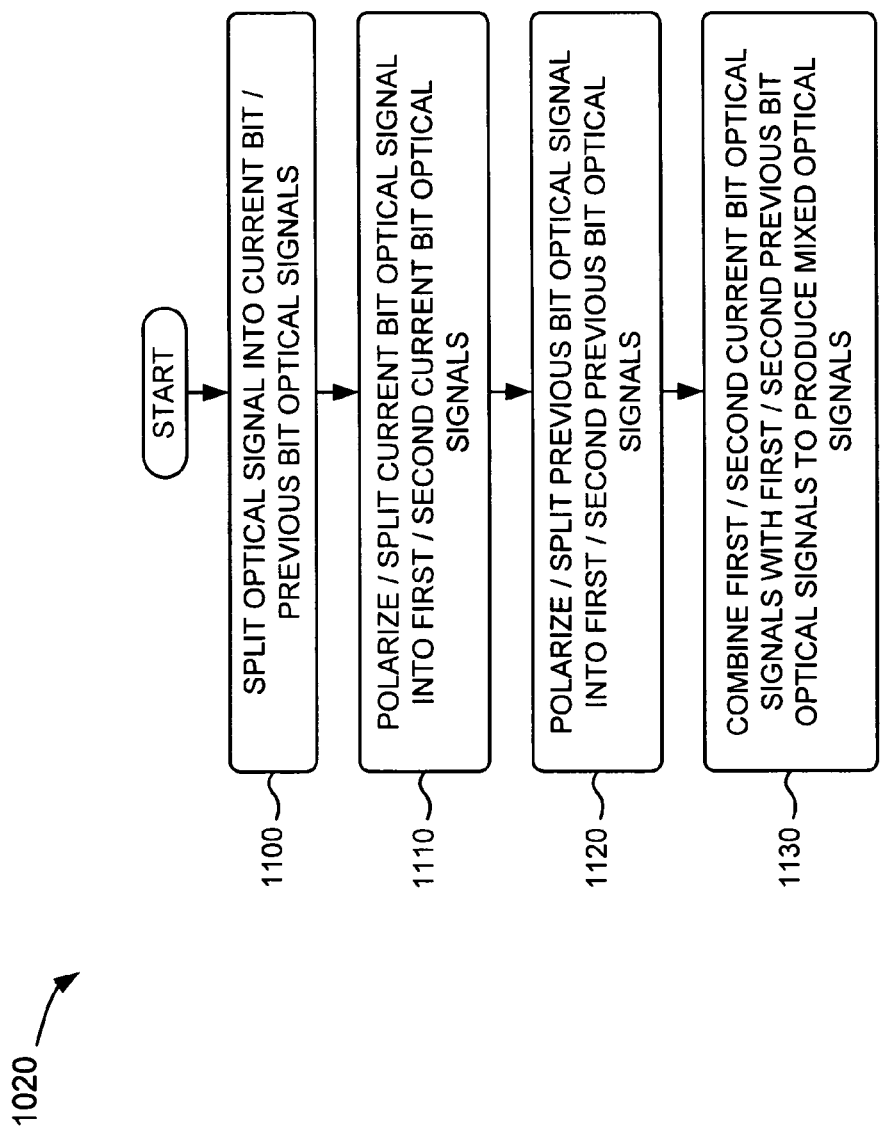

POLARIZATION DEMULTIPLEXING OPTICAL RECEIVER USING POLARIZATION OVERSAMPLING AND ELECTRONIC POLARIZATION TRACKING

BACKGROUND

An optical network is a system for communicating information over optical fiber using optical transmitters (e.g., lasers or light-emitting diodes (LEDs)) and optical receivers. Some optical networks use a digital modulation scheme that conveys data by changing, or modulating, a phase of a reference signal (e.g., a carrier wave or carrier signal). The digital modulation scheme may use a finite number of distinct signals to represent digital data. For example, a phase-shift keying (PSK) modulation scheme may capture modulation formats in which a phase of a carrier wave is modulated. One technique for transmitting a pair of data bits with a four-level code is quadrature phase-shift keying (QPSK) modulation, where each pair of bits is encoded during each symbol period as one of four possible phases of a transmitted carrier signal. Differential phase-shift keying (DPSK) is touted as a promising modulation format for optical communication systems requiring high spectral efficiency. The four-level version of DPSK (i.e., differential quadrature phase-shift keying (DQPSK)) transmits two bits for every symbol. In DQPSK modulation, each pair of data bits is encoded as one of four possible phase changes of a transmitted carrier signal. DQPSK has a narrower optical spectrum than conventional binary DPSK, which tolerates more dispersion (both chromatic and polarization-mode), allows for stronger optical filtering, and enables closer channel spacing. As a result, DQPSK may be the simplest modulation format which allows processing of forty (40) gigabits per second (G/s or Gbps) data-rate in a fifty (50) gigahertz (GHz) channel spacing system.

Some optical networks may employ a DQPSK digital modulation scheme by incorporating a DQPSK modulator in an optical transmitter and a DQPSK demodulator in an optical receiver. In order to recover independent data signals, without degradation from crosstalk, the carrier signal phase needs to be determined and demultiplexed with the DQPSK based optical receiver. This places stringent requirements on the alignment between the DQPSK based transmitter and the DQPSK demodulation filter (e.g., typically on the order of one-hundred megahertz (MHz) when twenty (20) G/s traffic is present). When this alignment is not met, in-phase and quadrature signal paths are not sufficiently isolated and each path suffers eye closure (e.g., distortion). Typical DQPSK demodulator filters are polarization sensitive, which compounds the difficulty of aligning the filters with carrier waves. Conventional DQPSK demodulators must be carefully designed in order to prevent such polarization sensitivity.

A polarization multiplexed intensity and phase modulated signal can be generally reconstructed by a class of cross polarization interference canceller (XPIC) circuitry either in the optical domain or the electrical domain. For example, polarization multiplexed QPSK information may be electronically recovered at an optical receiver, without polarization control hardware, using a combination of coherent detection (e.g., mixing a received signal with a local optical light source) and an electrical XPIC either in analog or digital format. However, coherent detection has many consequences, such as stringent phase requirements on transmit and receive optical light source stability and additional optical components. Furthermore, the electronics used in digital signal processing to recover a polarization-multiplexed QPSK signal consumes considerable power and are highly complex. Coherent detectors can also rely on analog carrier recovery circuits, but locking a local carrier can be a difficult task. Coherent detectors always carry an additional burden in terms of the optical generation and mixing of a local light source to the received light source.

For a non-coherent optical receiver used in a DQPSK system (i.e., a receiver without a local oscillator), a XPIC cannot be used directly in the electrical domain because the DQPSK system relies on differential phase information between adjacent bits to carry the signal and a photo detector will immediately lose this information. An optical XPIS is not feasible either because a quick transition in a fiber polarization state will make adjustment of optical components too slow on most platforms.

SUMMARY

According to one aspect, an optical receiver may include an optical processor circuit that receives an optical signal, and demodulates the optical signal to produce a mixed optical signal. The optical receiver may also include an optical detector array circuit that converts the mixed optical signal into a mixed electrical signal, and a signal processor circuit that reduces crosstalk in the optical signal, based on the mixed electrical signal, that is caused by a polarization and a carrier frequency associated with the optical signal.

According to another aspect, a device may include means for receiving an optical signal, means for demodulating the optical signal to produce one or more mixed optical signals, means for converting the one or more mixed optical signals into one or more mixed electrical signals, means for reducing crosstalk in the optical signal, based on the one or more mixed electrical signals, that is caused by a polarization and a carrier frequency associated with the optical signal, and means for outputting one or more data signals independent of the polarization and carrier frequency associated with the optical signal.

According to yet another aspect, a method may include receiving an optical signal, demodulating the optical signal to produce a plurality of mixed optical signals, and converting the plurality of mixed optical signals into a plurality of mixed electrical signals. The method may also include reducing crosstalk in the optical signal based on the plurality of mixed electrical signals.

According to still another aspect, a method may include receiving an optical signal, demodulating the optical signal to produce a plurality of mixed optical signals, and examining more than two polarization states associated with the optical signal. The method may also include converting the plurality of mixed optical signals into a plurality of mixed electrical signals, performing electrical polarization demultiplexing of the optical signal based on the plurality of mixed electrical signals and based on examining more than two polarization states associated with the optical signal, and outputting a data signal associated with the optical signal based on the electrical polarization demultiplexing of the optical signal.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 10-12 depict flow charts of an exemplary process according to implementations described herein.

DETAILED DESCRIPTION

Figure 1:
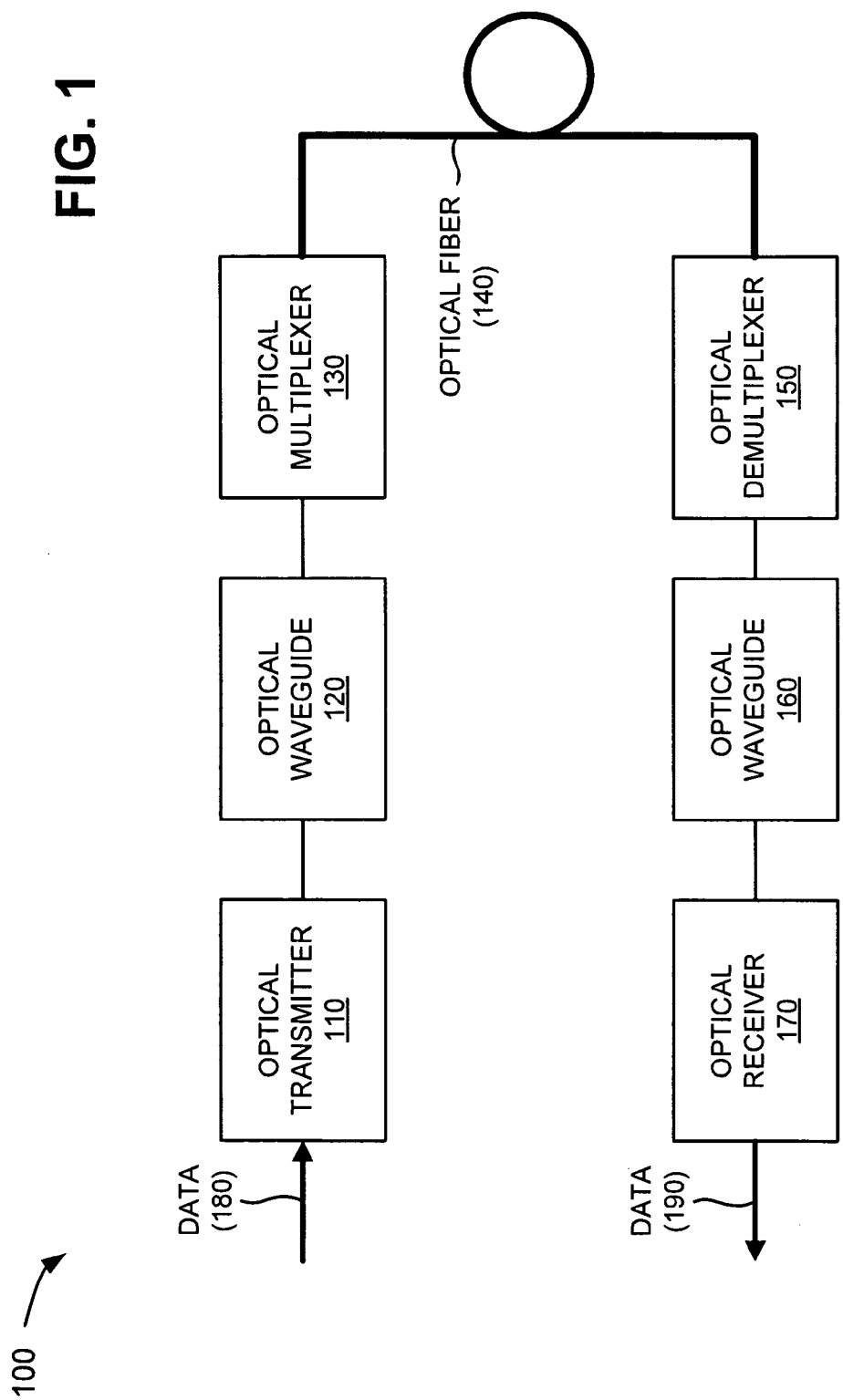
FIG. 1 is a diagram of an exemplary network in which systems and methods described herein may be implemented.

The following detailed description refers to the accompanying drawings. The same reference numbers in different drawings may identify the same or similar elements. Also, the following detailed description does not limit the invention.

Overview

As high-bandwidth applications for networks (e.g., optical networks) have grown, service providers responsible for providing such applications have sought higher data capacity within their optical networks. This has led to increased bitrates on individual optical channels, and an increased number of wavelength-division multiplexing based channels provided on optical fibers. However, this growth is becoming more difficult to handle because data bandwidth of individual optical channels cannot continue to increase without data bands overlapping. Thus, service providers are faced with finding ways to increase a spectral efficiency (e.g., a number of bits per second packed within a given optical bandwidth) of their optical networks.

One solution is polarization multiplexing, which takes advantage of the orthogonality of two polarization states provided in an optical fiber. By transmitting into orthogonal states, the data capacity of the optical fiber can be doubled. However, a main difficulty with polarization multiplexing is successfully recovering the orthogonal data streams at a receive end of an optical fiber. While splitting the polarization may be straightforward, the polarization must first be correctly aligned into an optical splitter. Since the optical fiber may rapidly rotate the polarization, an optical polarization controller is typically provided before the polarization splitting to guarantee that polarizations are aligned into an optical receiver. However, an optical polarization controller is complex, expensive, and requires complex algorithms.

Implementations described herein may provide an optical receiver that utilizes differential quadrature phase-shift keying (DQPSK) demodulation and electrical crosstalk rejection to relax requirements on filter misalignment with a carrier signal and to enable electronic polarization demultiplexing of optical signals. The optical receiver may include additional polarization state information when performing differential phase measurements on the optical signals. This may provide information that ensures that data can be recovered by the optical receiver regardless of the state of polarization introduced during transmission of the optical signals. DQPSK demodulation may provide a non-coherent scheme such that a reference or carrier signal may be unnecessary to determine a phase of a received signal. The optical receiver may over sample the optical signals (i.e., may examine more polarization states than the two orthogonal states provided by a polarization splitter). This may enable the optical receiver to perform electrical polarization demultiplexing of the optical signals (e.g., use electrical signal processing techniques to reverse the impact of the arbitrary polarization and carrier frequency of the incoming signal). The electrical crosstalk rejection may provide a tracking algorithm that isolates received optical signals, and reduces crosstalk between data sequences.

For example, in one implementation, the optical receiver may receive an optical signal, and may demodulate the optical signal with an optical processor (e.g., a DQPSK demodulator) to produce mixed optical signals. The optical receiver may over sample and convert the mixed optical signals into mixed electrical signals, and may use electronic or electrical crosstalk rejection, based on the mixed electrical signals, to eliminate or reduce crosstalk caused by a polarization and/or a carrier frequency of the optical signal. The optical receiver may also output data signals independent of the determined polarization and/or carrier frequency of the optical signal.

A "mixed optical signal" and/or "mixed optical signals," as the terms are used herein, are to be broadly construed to include a combination of optical signals that include different polarizations, phases, latencies, etc. A "mixed electrical signal" and/or "mixed electrical signals," as the terms are used herein, are to be broadly construed to include mixed optical signals converted (e.g., via an optical, such as a photodiode) into an electrical format.

Exemplary Network Configuration

FIG. 1 is a diagram of an exemplary network 100 in which systems and methods described herein may be implemented. As illustrated, network 100 may include an optical transmitter 110, an optical waveguide 120, an optical multiplexer 130, an optical fiber 140, an optical demultiplexer 150, an optical waveguide 160, and an optical receiver 170. A single optical transmitter, two optical waveguides, a single optical multiplexer, a single optical fiber, a single optical demultiplexer, and a single optical receiver have been illustrated in FIG. 1 for simplicity. In practice, there may be more optical transmitters, optical waveguides, optical multiplexers, optical fibers, optical demultiplexer, and/or optical receivers. Also, in some instances, one or more of optical transmitter 110, optical waveguide 120, optical multiplexer 130, optical demultiplexer 150, optical waveguide 160, and/or optical receiver 170 may perform one or more other tasks described as being performed by one or more of optical transmitter 110, optical waveguide 120, optical multiplexer 130, optical demultiplexer 150, optical waveguide 160, and/or optical receiver 170. Although not shown in FIG. 1, network 100 may include one or more optical amplifiers that may amplify optical signals provided through network 100.

Optical transmitter 110 may include a device capable of transmitting optical signals associated with data 180. In one implementation, optical transmitter 110 may include a device capable of transmitting optical signals that include DQPSK based data. Further details of optical transmitter 110 are provided below in connection with FIG. 2.

Each of optical waveguides 120 and 160 may include a physical structure (e.g., an optical fiber, a rectangular waveguide, an array waveguide grating, etc.) that may guide electromagnetic waves (e.g., optical signals) in the optical spectrum, and may be made from a variety of materials (e.g., a dielectric material with high permittivity, a photonic-crystal fiber, etc.). In one implementation, optical waveguide 120 (e.g., alone or in combination with optical multiplexer 130) may receive an optical signal from optical transmitter 110, and may multiplex the optical signal into one or more wavelengths (e.g., a dense comb of independent wavelengths). In another implementation, optical waveguide 160 (e.g., alone or in combination with optical demultiplexer 150) may receive the one or more wavelengths of the optical signal, may separate the one or more wavelengths, and may extract individual channels from the optical signal.

Optical multiplexer 130 may include an optical device (e.g., an interleaver) that may combine two sets of dense wavelength-division multiplexing (DWDM) channels (e.g., odd and even channels) into a composite signal stream. For example, optical multiplexer 130 may take two multiplexed signals with one-hundred (100) GHz spacing, and may interleave them to create a denser DWDM signal with channels spaced fifty (50) GHz apart.

Optical fiber 140 may include a connection, a coupling, a link, or other similar mechanism by which optical signals, which may be carried by one optical component, may be imparted to a communicating optical component. For example, optical fiber 140 may permit optical transmitter 110 to optically communicate with optical receiver 170, and may permit optical signals to be transmitted to optical receiver 170. "Optically communicating" devices may not necessarily be directly connected to one another and may be separated by intermediate optical components or devices.

Optical demultiplexer 150 may include an optical device (e.g., a de-interleaver) that may separate a denser DWDM signal into odd channels and even channels (e.g., a reverse of the function performed by optical multiplexer 130).

Optical receiver 170 may include a device capable of receiving optical signals, and outputting optical signals as data 190. In one implementation, optical receiver 170 may include a device capable of receiving DQPSK based optical signals. Further details of optical receiver 170 are provided below in connection with FIGS. 3-8.

Data 180 and 190 may include information capable of being conveyed via an optical communications network (e.g., network 100). In one exemplary implementation, data 180 and 190 may include four (4) ten (10) G/s data streams.

In operation, as further shown in FIG. 1, data 180 may be received by optical transmitter 110, and optical transmitter 110 may generate an optical signal based on data 180. The optical signal may be multiplexed via optical waveguide 120 and/or optical multiplexer 130 to form a dense comb of independent wavelengths. The dense comb of wavelengths may be transmitted through optical fiber 140, and may be amplified using optical amplifiers (not shown) provided at a beginning portion, an intermediate portion, and/or an end portion of optical fiber 140. The independent wavelengths may be separated via optical demultiplexer 150 and/or optical waveguide 160 to extract individual channels from the independent wavelengths. Optical receiver 170 may receive the individual channels and may output data 190 based on information received via the individual channels.

Exemplary Optical Transmitter Configuration

Figure 2:
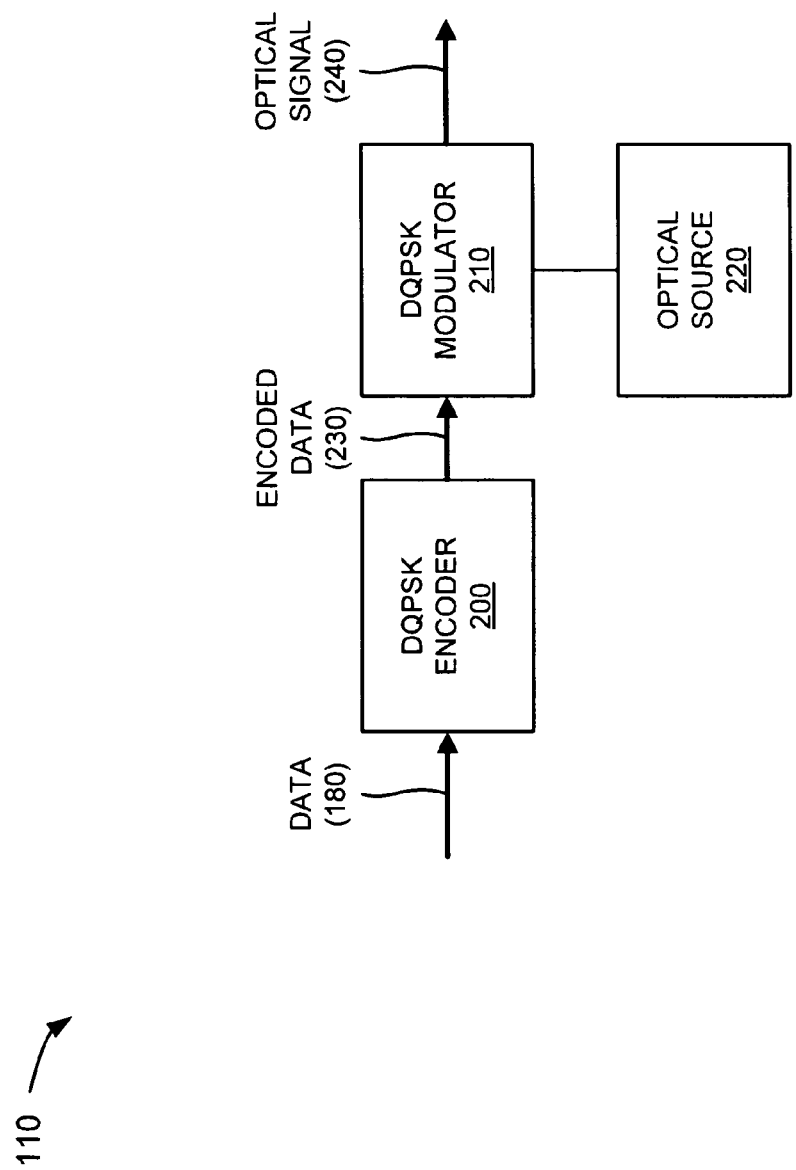
FIG. 2 illustrates exemplary components of an optical transmitter of the network depicted in FIG. 1.

FIG. 2 illustrates exemplary components of optical transmitter 110. As shown, optical transmitter 110 may include a DQPSK encoder 200, a DQPSK modulator 210, and an optical source 220.

DQPSK encoder 200 may include a device that encodes a data signal based on a differential quadrature phase-shift keying (DQPSK) modulation scheme. In one implementation, DQPSK encoder 200 may receive a data stream (e.g., data 180), and may encode the data stream to produce an encoded data stream (e.g., encoded data 230). DQPSK encoder 230 may provide encoded data 230 to DQPSK modulator 210.

DQPSK modulator 210 may include a device that receives a signal (e.g., a discrete time signal), and modulates the signal using the DQPSK modulation scheme. In one implementation, DQPSK modulator 210 may receive encoded data 230 from DQPSK encoder 200, may receive light (e.g., from optical source 220), and may modulate encoded signal 230 to produce an optical signal 240 (e.g., a DQPSK modulated optical signal). DQPSK modulator 210 may provide optical signal 240 to optical waveguide 120.

Optical source 220 may include a device capable of generating optical signals. For example, in one implementation, optical source 220 may include a laser. In one exemplary implementation, optical source 220 may generate an optical signal (e.g., light), and may provide the optical signal to DQPSK modulator 210. DQPSK modulator 210 may use the optical signal provided by optical source 220 to generate optical signal 240.

Although FIG. 2 shows exemplary components of optical transmitter 110, in other implementations, optical transmitter 110 may contain fewer, different, or additional components than depicted in FIG. 2. In still other implementations, one or more components of optical transmitter 110 may perform one or more other tasks described as being performed by one or more other components of optical transmitter 110.

Exemplary Optical Receiver Configuration

Figure 3:
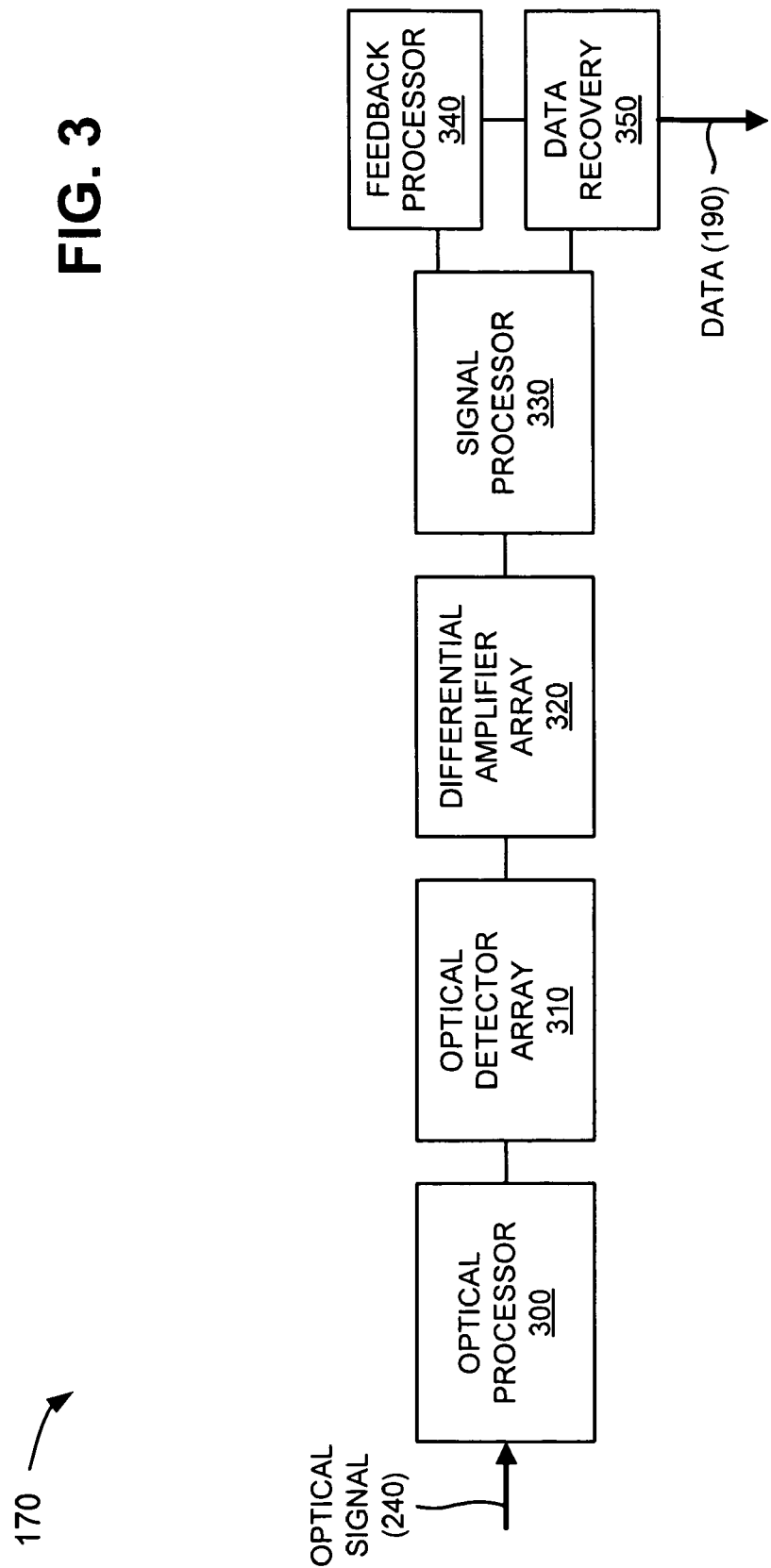
FIG. 3 depicts exemplary components of an optical receiver of the network depicted in FIG. 1.

FIG. 3 depicts exemplary components of optical receiver 170. As illustrated, optical receiver 170 may include an optical processor 300, an optical detector array 310, a differential transimpedance amplifier array 320, a signal processor 330, a feedback processor 340, and data recovery 350.

Optical processor 300 may include a device or circuit that receives an optical signal (e.g., optical signal 240), and splits the optical signal into a current bit optical signal and a previous bit optical signal. Optical processor 300 may polarize and split the current bit optical signal and the previous bit optical signal, and may combine the polarized and split current bit optical signal with the polarized and split previous bit optical signal to produce one or more mixed optical signals. Optical processor 300 may provide the one or more mixed optical signals to optical detector array 310. In one implementation, optical processor 300 may constitute an optical demultiplexer/demodulator for optical signals provided in a DQPSK modulation format. Further details of optical processor 300 are provided below in connection with FIG. 4.

Optical detector array 310 may include an array or circuit of one or more optical detectors. Each optical detector may receive a corresponding one of the one or more mixed optical signals, and may convert the mixed optical signal into a mixed electrical signal (e.g., by generating an electrical current proportional to an intensity of incident optical radiation). In one exemplary implementation, each optical detector may include a photodiode, such as a semiconductor positive-intrinsic-negative (PIN) photodiode, an avalanche photodiode (APD), etc. Optical detector array 310 may provide the one or more mixed electrical signals to differential transimpedance amplifier array 320. Further details of optical detector array 310 are provided below in connection with FIG. 5.

Differential transimpedance amplifier array 320 may include an array or circuit of one or more differential amplifiers. Each differential amplifier may receive mixed electrical signals from a corresponding pair of optical detectors (e.g., provided by optical detector array 310), and may multiply a difference between the two inputs (e.g., mixed electrical signals) by a constant factor (e.g., a differential gain). Each differential amplifier may output a signal (e.g., an in-phase (I) signal or a quadrature-phase (Q) signal) based on the received mixed electrical signals. Further details of differential transimpedance amplifier array 320 are provided below in connection with FIG. 5.

Signal processor 330 may include a device or circuit that electronically reduces crosstalk between data signals (e.g., one or more mixed electrical signals). In one implementation, signal processor 330 may include a device capable of using multiple-input multiple-output (MIMO) signal processing (e.g., eight input, four output MIMO signal processing) to reduce crosstalk between data signals. For example, signal processor 330 may receive complex signals (e.g., from pairs of differential amplifiers within differential transimpedance amplifier array 320), and may reduce crosstalk between the complex signals using MIMO signal processing. Signal processor 330 may output multiple data streams to feedback processor 340 and/or data recovery 350. Further details of signal processor 330 are provided below in connection with FIG. 6.

Feedback processor 340 may include a device or circuit that detects a correlation between received data streams (e.g., data streams provided by signal processor 330). In one implementation, feedback processor 340 may include a device capable of using a least-mean squares (LMS) algorithm to detect a correlation between received data streams. For example, feedback processor 340 may receive data streams from signal processor 330, and may use a LMS algorithm to detect a correlation between the data streams. Feedback processor 340 may receive one or more error signals based on a difference between the data streams received from signal processor 330 and recovered data streams (e.g., data 190). The LMS algorithm may determine filter coefficients that produce the least-mean squares of the error signals. Feedback processor 340 may provide feedback to signal processor 330 until the error signals are minimized (e.g., below a particular threshold) and/or eliminated. Further details of feedback processor 340 are provided below in connection with FIG. 7.

Data recovery 350 may include a device or circuit that generates error signals based on a difference between the data streams received from signal processor 330 and recovered data streams (e.g., data 190), and outputs recovered data streams (e.g., data 190) if the error signals are minimized (e.g., below a particular threshold) and/or eliminated. In one implementation, data recovery 350 may include one or more limiting amplifiers. Each limiting amplifier may receive data streams from signal processor 330, and may limit a voltage (e.g., an upper voltage limit and a lower voltage limit) of an output signal. Each limiting amplifier may generate data 190 (e.g., a ten (10) G/s data stream) without crosstalk if the error signals are minimized (e.g., below a particular threshold) and/or eliminated. Further details of data recovery 350 are provided below in connection with FIG. 7.

Although FIG. 3 shows exemplary components of optical receiver 170, in other implementations, optical receiver 170 may contain fewer, different, or additional components than depicted in FIG. 3. In still other implementations, one or more components of optical receiver 170 may perform one or more other tasks described as being performed by one or more other components of optical receiver 170.

Exemplary Optical Processor Configuration

Figure 4:
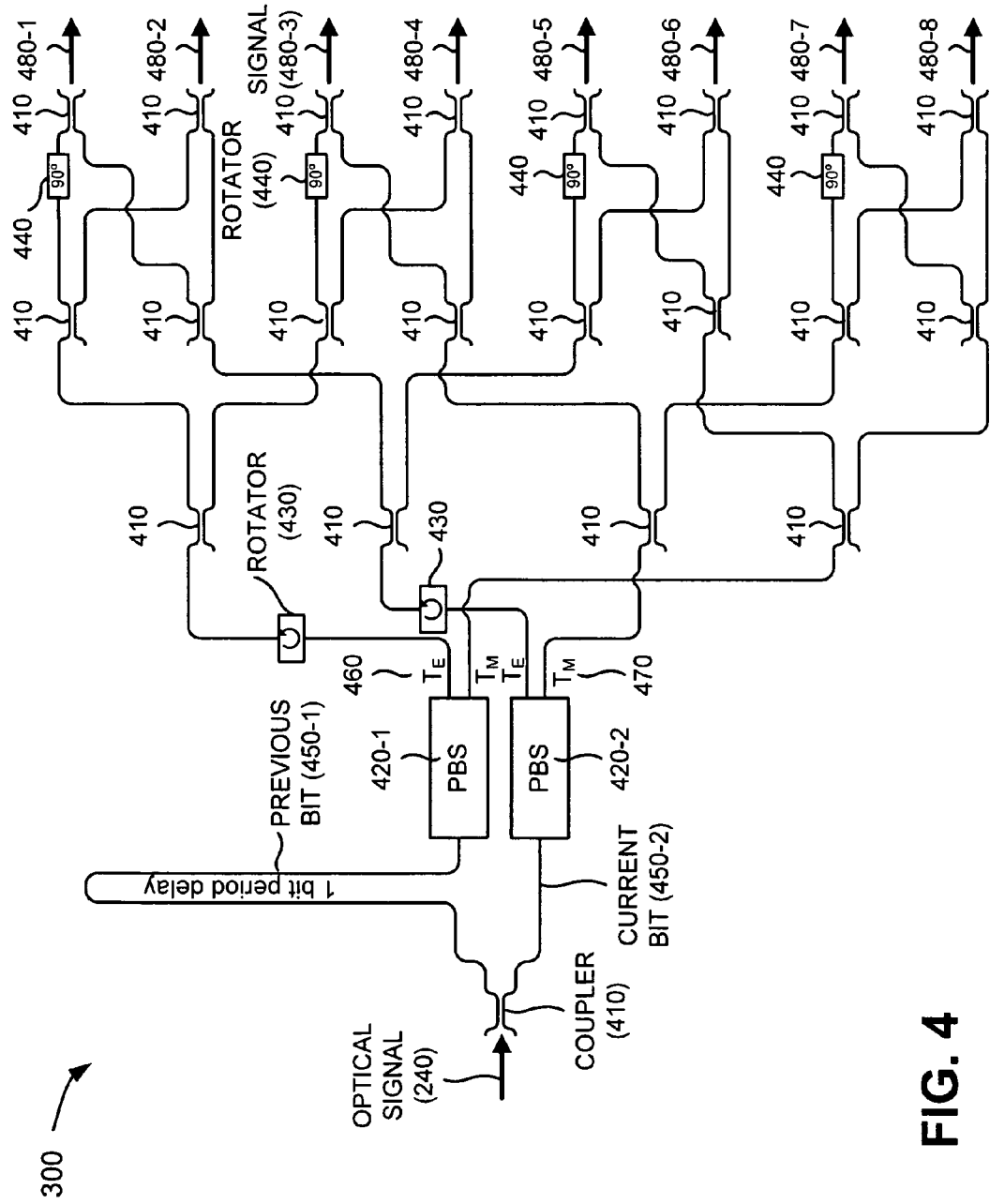
FIG. 4 illustrates a diagram of exemplary components of an optical processor of the optical receiver depicted in FIG. 3.

FIG. 4 illustrates a diagram of exemplary components of optical processor 300. As shown, optical processor 300 may include multiple couplers 410, polarization beam splitters (PBS) 420-1 and 420-2 (collectively referred to as "polarization beam splitters 420" and singularly as "polarization beam splitter 420"), polarization rotators 430, and optical phase rotators 440.

Each of couplers 410 may include an optical device (e.g., an optical coupler) that splits optical signals into multiple paths, or combines multiple optical signals into a single path. In one implementation, for example, each of couplers 410 may include an optical splitter (e.g., an optical device that splits an optical signal into multiple paths of optical signals), a wavelength division multiplexer (WDM) (e.g., an optical device that permits two or more different wavelengths of optical signals to be split into multiple paths or combined onto a single path), a fused fiber coupler, a coupler integrated into a planar lightwave circuit, etc. As further shown in FIG. 4, couplers 410 may split optical signals into multiple paths. For example, coupler 410 (to the far left in FIG. 4) may receive optical signal 240, and may split optical signal 240 into two paths. A first path may be delayed by a period (e.g., one bit period delay via a bit-delay interferometer) to produce a previous bit optical signal 450-1, and a second path may not be delayed to produce a current bit optical signal 450-2. In other implementations, the bit-delay interferometer may be provided before optical waveguide 160 or after polarization splitting structures.

Each of polarization beam splitters 420 may include an optical device that splits a received optical signal into two optical signals of differing polarization. In one implementation, for example, polarization beam splitter 420-1 may receive previous bit optical signal 450-1, and may split previous bit optical signal 450-1 into two optical signals of differing polarization (e.g., a first transverse electrical ($T_E$) optical signal 460 and a first transverse magnetic ($T_M$) optical signal 470). Similarly, polarization beam splitter 420-2 may receive current bit optical signal 450-2, and may split current bit optical signal 450-2 into two optical signals of differing polarization (e.g., a second transverse electrical optical signal 460 and a second transverse magnetic optical signal 470).

Each of polarization rotators 430 may include an optical device that rotates a polarization plane of an optical signal (e.g., a particular number of degrees) as the optical signal passes through the device. In one implementation, each of polarization rotators 430 may rotate a polarization plane of an optical signal ninety (90) degrees as the optical signal passes through polarization rotator 430.

Each of optical phase rotators 440 may include an optical device that introduces a small delay to an optical signal (e.g., a particular number of degrees in optical phase) as the optical signal passes through the device. In one implementation, each of optical phase rotators 440 may delay an optical signal ninety (90) degrees as the optical signal passes through optical phase rotator 440.

In operation and as further shown in FIG. 4, optical signal 240 (e.g., which may be provided in a DQPSK modulation format) may be demodulated and/or demultiplxed by the arrangement of optical processor 300. Furthermore, first and second transverse electrical optical signals 460 and first and second transverse magnetic optical signals 470 may be optically split (e.g., via couplers 410) and rotated (e.g., via polarization rotators 430) in order to produce multiple mixed optical signal pairs (e.g., signal pairs 480-1, . . . , 480-8). Optical processor 300 may provide the multiple mixed optical signal pairs (e.g., signal pairs 480-1, . . . , 480-8) to optical detector array 310 for further processing.

Although FIG. 4 shows exemplary components of optical processor 300, in other implementations, optical processor 300 may contain fewer, different, or additional components than depicted in FIG. 4. In still other implementations, one or more components of optical processor 300 may perform one or more other tasks described as being performed by one or more other components of optical processor 300.

Exemplary Optical Detector Array/Differential Amplifier Array Configuration

Figure 5:
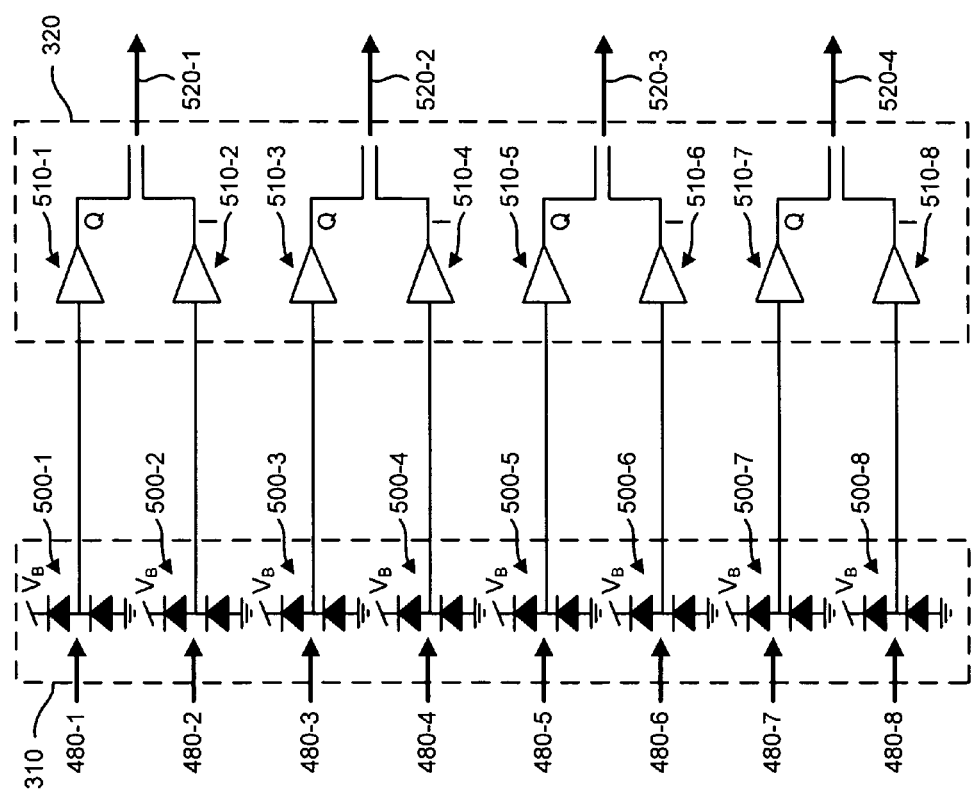
FIG. 5 depicts a diagram of exemplary components of an optical detector array and a differential amplifier array of the optical receiver illustrated in FIG. 3.

FIG. 5 depicts a diagram of exemplary components of optical detector array 310 and differential transimpedance amplifier array 320, and interrelations among the exemplary components. As illustrated, optical detector array 310 may include an array of one or more optical detector pairs 500-1, . . . , 500-8 (collectively referred to as "optical detector pairs 500" and singularly as "optical detector pair 500"), and differential transimpedance amplifier array 320 may include an array of one or more differential transimpedance amplifiers 510-1, . . . , 510-8 (collectively referred to as "differential amplifiers 510" and singularly as "differential amplifier 510").

Optical detector pair 500 may include a pair of optical detectors that may convert one or more optical signals into one or more electrical signals (e.g., by generating an electrical voltage or current proportional to an intensity of incident optical radiation). In one exemplary implementation, each optical detector of optical detector pair 500 may include a photodiode, such as a semiconductor positive-intrinsic-negative (PIN) photodiode, an avalanche photodiode (APD), etc. In one implementation, optical detector pair 500 may receive a corresponding one of mixed optical signal pairs (e.g., a corresponding one of signal pairs 480-1, . . . , 480-8), may convert the corresponding mixed optical signal pair into a mixed electrical signal pair, and may provide the mixed electrical signal pair to a corresponding one of differential amplifiers 510 (e.g., of differential transimpedance amplifier array 320). For example, optical detector pair 500-1 may receive signal pair 480-1 (e.g., from optical processor 300), may convert signal pair 480-1 into a mixed electrical signal pair, and may provide the mixed electrical signal pair to differential amplifier 510-1.

Differential amplifier 510 may include a device that may receive mixed electrical signals from a corresponding optical detector pair 500 (e.g., provided by optical detector array 310), and may multiply a difference between the two inputs (e.g., mixed electrical signals) by a constant factor (e.g., a differential gain). Differential amplifier may output a signal (e.g., an in-phase (I) signal or a quadrature-phase (Q) signal) based on the received mixed electrical signals. For example, differential amplifier 510-1 may receive a mixed electrical signal pair from optical detector pair 500-1, and may output a quadrature-phase (Q) signal based on the received mixed electrical signal pair. Differential amplifier 510-2 may receive a mixed electrical signal pair from optical detector pair 500-2, and may output an in-phase (I) signal based on the received mixed electrical signal pair. For simplicity in describing the signal processing that follows, the two electrical signals can be described as carrying the quadrature-phase (Q) signal and the in-phase (I) components of the complex value of the change in optical phase between two sequential bits. The resulting complex signal 520-1 (e.g., a mixed electrical signal pair) may be output to signal processor 330. Similarly, differential amplifiers 510-3 and 510-4 may produce a complex signal 520-2, differential amplifiers 510-5 and 510-6 may produce a complex signal 520-3, and differential amplifiers 510-7 and 510-8 may produce a complex signal 520-4 for output to signal processor 330.

Although FIG. 5 shows exemplary components of optical detector array 310 and differential transimpedance amplifier array 320, in other implementations, optical detector array 310 and/or differential transimpedance amplifier array 320 may contain fewer, different, or additional components than depicted in FIG. 5. In other implementations, one or more components of optical detector array 310 and/or differential transimpedance amplifier array 320 may perform one or more other tasks described as being performed by one or more other components of optical detector array 310 and/or differential transimpedance amplifier array 320. In still other implementations, differential transimpedance amplifier array 320 may be replaced with single-ended transimpedance amplifiers if a current sum were performed at optical detector array 320 instead of at differential transimpedance amplifier array 320.

Exemplary Signal Processor Configuration

Figure 6:
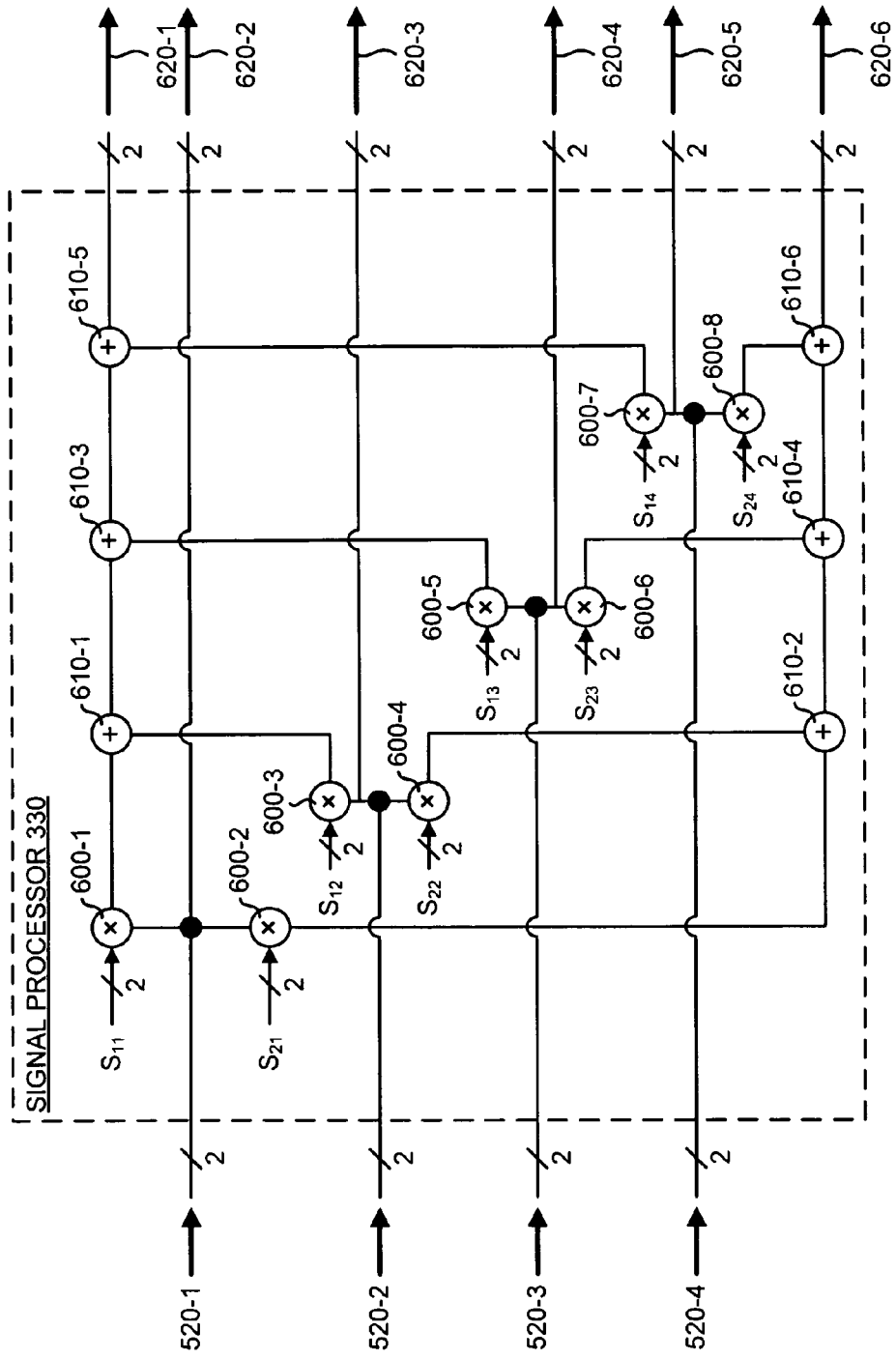
FIG. 6 illustrates a diagram of exemplary components of a signal processor of the optical receiver depicted in FIG. 3.

FIG. 6 illustrates a diagram of exemplary components of signal processor 330. As shown, signal processor 330 may include one or more gain elements 600-1, . . . , 600-8 (collectively referred to as "gain elements 600" and singularly as "gain element 600"), and one or more linear sum elements 610-1, . . . , 610-6 (collectively referred to as "linear sum elements 610" and singularly as "linear sum element 610").

As further shown in FIG. 6, a "/2" designation may indicate that two signals (e.g., two signals designated as $S_{11}$) are provided on a single line, representing a complex signal's in-phase (I) and quadrature-phase (Q) components. Signals $S_{11}$, $S_{21}$, $S_{12}$, $S_{22}$, $S_{13}$, $S_{23}$, $S_{14}$, and $S_{24}$ may be received by signal processor 330 from feedback processor 340, and may be based on signals received from differential transimpedance amplifier array 320. Further details of signals $S_{11}$, $S_{21}$, $S_{12}$, $S_{22}$, $S_{13}$, $S_{23}$, $S_{14}$, and $S_{24}$ are provided below.

Gain element 600 may include a device that receives four signals (e.g., analog signals) and produces an output that is a complex product of the four signals. In one implementation, gain element 600 may include an analog multiplier, a voltage-controlled amplifier, a voltage-controlled attenuator, etc. A complex multiplier stage may be implemented as follows. The output in-phase (I) component may be a product of the first input's in-phase (I) and second input's in-phase (I) component, minus a product of the first input's quadrature-phase (Q) and second input's quadrature-phase (Q) component. The output quadrature-phase (Q) component may be a product of the first input's in-phase (I) and second input's quadrature-phase (Q) component, plus a product of the first input's quadrature-phase (Q) and second input's in-phase (I) component.

As further shown in FIG. 6, gain element 600-1 may receive four signals (e.g., two signals designated as $S_{11}$ and two signals 520-1), may multiply the four signals, and may output the complex product of the four signals. Gain element 600-2 may receive four signals (e.g., two signals designated as $S_{21}$ and two signals 520-1), and may output the complex product of the four signals. Gain element 600-3 may receive four signals (e.g., two signals designated as $S_{12}$ and two signals 520-2), and may output the complex product of the four signals. Gain element 600-4 may receive four signals (e.g., two signals designated as $S_{22}$ and two signals 520-2), and may output the complex product of the four signals. Gain element 600-5 may receive four signals (e.g., two signals designated as $S_{13}$ and two signals 520-3), and may output the complex product of the four signals. Gain element 600-6 may receive four signals (e.g., two signals designated as $S_{23}$ and two signals 520-3), and may output the complex product of the four signals. Gain element 600-7 may receive four signals (e.g., two signals designated as $S_{14}$ and two signals 520-4), and may output the complex product of the four signals. Gain element 600-8 may receive four signals (e.g., two signals designated as $S_{24}$ and two signals 520-4), and may output the complex product of the four signals.

Linear sum element 610 may include a device that receives four signals (e.g., analog signals) and produces an output that is a linear sum of the four signals. An in-phase (I) component of the output may be the sum of two in-phase (I) inputs, and a quadrature-phase (Q) component of the output may be the sum of two quadrature-phase (Q) inputs. As further shown in FIG. 6, linear sum element 610-1 may receive four signals (e.g., I and Q signals from gain element 600-1 and I and Q signals from gain element 600-3), and may produce an output that is a linear sum of the four signals. Linear sum element 610-2 may receive four signals (e.g., I and Q signals from gain element 600-2 and I and Q signals from gain element 600-4), and may produce an output that is a linear sum of the four signals. Linear sum element 610-3 may receive four signals (e.g., I and Q signals from linear sum element 610-1 and I and Q signals from gain element 600-5), and may produce an output that is a linear sum of the four signals. Linear sum element 610-4 may receive four signals (e.g., I and Q signals from linear sum element 610-2 and I and Q signals from gain element 600-6), and may produce an output that is a linear sum of the four signals. Linear sum element 610-5 may receive four signals (e.g., I and Q signals from linear sum element 610-3 and I and Q signals from gain element 600-7), and may produce an output that is a linear sum of the four signals. Linear sum element 610-6 may receive four signals (e.g., I and Q signals from linear sum element 610-4 and I and Q signals from gain element 600-8), and may produce an output that is a linear sum of the four signals.

As further shown in FIG. 6, signal processor 330 may receive complex signals 520-1, 520-2, 520-3, and 520-4, and may pass them on to produce mixed electrical signal pairs 620-2, 620-3, 620-4, and 620-5. For example, complex signal 520-1 may be output as mixed electrical signal pair 620-2. Complex signal 520-2 may be output as mixed electrical signal pair 620-3. Complex signal 520-3 may be output as mixed electrical signal pair 620-4. Complex signal 520-4 may be output as mixed electrical signal pair 620-5. Signal processor 330 may provide mixed electrical signal pairs 620-2, 620-3, 620-4, and 620-5 to feedback processor 340.

Furthermore, linear sum element 610-5 may output mixed electrical signal pair 620-1, and linear sum element 610-6 may output mixed electrical signal pair 620-6. Signal processor 330 may provide mixed electrical signal pairs 620-1 and 620-6 to data recovery 350.

In one implementation, signal processor 330 may reduce crosstalk between complex signals (e.g., complex signals 520-1, 520-2, 520-3, and 520-4) using MIMO signal processing. The following may provide a mathematical foundation for use of MIMO signal processing by signal processor 330. For example, electrical outputs ($E_{out}$) may represent an optical phase difference between two sequential bits as two electrical signal representing in-phase (I) and quadrature-phase (Q) components of the optical phase difference. The two electrical signals may carry in-phase and quadrature portions of the phase on two distinct lines. However, it may be convenient to represent the two signals mathematically as one complex value. The extraction of an optical phase difference using differential photodiodes as electrical outputs ($E_{out}$) may be represented as set forth in the following equation (Equation 1):

$$E_{out} = PD1 - PD2 + jPD3 - iPD4 \quad \text{(Equation 1)}$$

$$= |e^{i\alpha_{k+1}} + e^{i\alpha_k}|^2 - |e^{i\alpha_{k+1}} - e^{i\alpha_k}|^2 +$$

$$i|e^{i\alpha_{k+1}} + ie^{i\alpha_k}|^2 - i|e^{i\alpha_{k+1}} - ie^{i\alpha_k}|^2$$

$$= (e^{-i\alpha_{k+1}} + e^{-i\alpha_k})(e^{i\alpha_{k+1}} + e^{i\alpha_k}) -$$

$$(e^{-i\alpha_{k+1}} - e^{-i\alpha_k})(e^{i\alpha_{k+1}} - e^{i\alpha_k}) +$$

$$i(e^{-i\alpha_{k+1}} - ie^{-i\alpha_k})(e^{i\alpha_{k+1}} + ie^{i\alpha_k}) -$$

$$(e^{-i\alpha_{k+1}} + ie^{-i\alpha_k})(e^{i\alpha_{k+1}} - ie^{i\alpha_k})$$

$$= 2\cos(\alpha_{k-1} - \alpha_k) + 2i\sin(\alpha_{k+1}\alpha_k)$$

$$= 2e^{i(\alpha_{k+1} - \alpha_k)}$$

PD1 refers to a signal detected by a first photodiode (e.g., one of optical detectors of optical detector array 310) at a defined bit's time slot, PD2 refers to a signal detected by a second photodiode at the defined bit's time slot, PD3 refers to a signal detected by a third photodiode at the defined bit's time slot, PD4 refers to a signal detected by a fourth photodiode at the defined bit's time slot, $\alpha$ refers to an encoded phase at the defined bit's time slot, k refers to the defined bit, and i refer to the imaginary number $\sqrt{-1}$.

In order to extract the phase change between two sequential bits in a polarization multiplexed DQPSK modulation scheme, a circuit may be represented mathematically using the following equations (Equations 2 and 3).

$$\begin{bmatrix} e^{-i\alpha_{k+1}} & e^{-i\beta_{k+1}} \end{bmatrix} \begin{bmatrix} 1 & 0 \\ 0 & 0 \end{bmatrix} \begin{bmatrix} e^{i\alpha_k} \\ e^{i\beta_k} \end{bmatrix} \quad \text{(Equation 2)}$$

$$\begin{bmatrix} e^{-i\alpha_{k+1}} & e^{-i\beta_{k+1}} \end{bmatrix} \begin{bmatrix} 1 & 0 \\ 0 & 0 \end{bmatrix} \begin{bmatrix} e^{i\alpha_k} \\ e^{i\beta_k} \end{bmatrix} \quad \text{(Equation 3)}$$

$\beta$ refers to an encoded phase at orthogonal polarization in a polarization multiplexing system (e.g., a counterpart to $\alpha$). In this case, two polarization orthogonal polarization states generated at an optical transmitter (e.g., optical transmitter 110) may be shown as having arrived at an optical receiver (e.g., optical receiver 170) without any rotations. The matrix may represent an ideal polarization splitter, which may yield two (complex) electrical outputs representing a phase change for horizontal and vertical polarizations.

A polarization rotation through a lossless fiber may be represented by a Jones (i.e., an arbitrary polarization rotation) matrix (R), as shown in the following equation (Equation 4).

$$R = \begin{bmatrix} e^{i\phi}\cos\theta & -e^{-i\varphi}\sin\theta \\ e^{i\varphi}\sin\theta & e^{-i\phi}\cos\theta \end{bmatrix} \quad \text{(Equation 4)}$$

ø refers to a differential delay of first and second eigenstates, φ refers to a differential delay seen by mixed eigenstates, and θ refers to a mixing angle between polarization eigenstates.

For optical signals transmitted through an arbitrary polarization rotation, corresponding electrical signals may be described based on the following equations (Equations 5 and 6).

$$\begin{bmatrix} e^{-i\alpha_{k+1}} & e^{-i\beta_{k+1}} \end{bmatrix} R^{\dagger} \begin{bmatrix} 1 & 0 \\ 0 & 0 \end{bmatrix} R \begin{bmatrix} e^{i\alpha_k} \\ e^{i\beta_k} \end{bmatrix} \quad \text{(Equation 5)}$$

$$\begin{bmatrix} e^{-i\alpha_{k+1}} & e^{-i\beta_{k+1}} \end{bmatrix} R^{\dagger} \begin{bmatrix} 1 & 0 \\ 0 & 0 \end{bmatrix} R \begin{bmatrix} e^{i\alpha_k} \\ e^{i\beta_k} \end{bmatrix} \quad \text{(Equation 6)}$$

It may be expedient to manipulate the rotation and polarization matrices without initial state vectors, i.e., $$\left( R^{\dagger} \begin{bmatrix} 0 & 0 \\ 0 & 1 \end{bmatrix} R \right)$$

by itself, which may yield the following equations (Equations 7-10).

$$R^{\dagger} \begin{bmatrix} 1 & 0 \\ 0 & 0 \end{bmatrix} R = \begin{bmatrix} \cos^2\theta & -e^{-i\phi-i\varphi}\sin\theta\cos\theta \\ -e^{i\phi+i\varphi}\sin\theta\cos\theta & \sin^2\theta \end{bmatrix} \quad \text{(Equation 7)}$$

$$R^{\dagger} \begin{bmatrix} 0 & 1 \\ 0 & 0 \end{bmatrix} R = e^{i\phi+i\varphi} \begin{bmatrix} \sin\theta\cos\theta & e^{-i\phi-i\varphi}\cos^2\theta \\ -e^{i\phi+i\phi}\sin^2\theta & -\sin\theta\cos\theta \end{bmatrix} \quad \text{(Equation 8)}$$

$$R^{\dagger} \begin{bmatrix} 0 & 0 \\ 1 & 0 \end{bmatrix} R = e^{i\phi-i\varphi} \begin{bmatrix} \sin\theta\cos\theta & -e^{-i\phi-i\varphi}\cos^2\theta \\ e^{i\phi+i\phi}\cos^2\theta & -\sin\theta\cos\theta \end{bmatrix} \quad \text{(Equation 9)}$$

$$R^{\dagger} \begin{bmatrix} 0 & 0 \\ 0 & 1 \end{bmatrix} R = \begin{bmatrix} \sin^2\theta & -e^{-i\phi-i\varphi}\sin\theta\cos\theta \\ e^{i\phi+i\phi}\cos^2\theta & \cos^2\theta \end{bmatrix} \quad \text{(Equation 10)}$$

The off-diagonal elements of Equations 7 and 10 may prohibit extracting original data streams for an arbitrary polarization rotation (e.g., R). However, if transverse electrical ($T_E$) signals and transverse magnetic ($T_M$) signals (e.g., transverse electrical ($T_E$) optical signals 460 and transverse magnetic ($T_M$) optical signals 470) are mixed together (e.g., using a ninety degree rotation of one of the polarization states), additional information may be obtained from incoming data streams. These terms may be represented by Equations 8 and 9. This may require an extra octuplet of optical detectors (e.g., for optical detector array 310).

In order to demonstrate that data may be sufficient for electrically demodulating incoming data streams without regard to the polarization state, the sixteen values shown in Equations 7-10 may be rearranged into a four by four matrix (M) as shown in the following equation (Equation 11).

(Eq. 11)
$$M = \begin{bmatrix} \cos^2\theta & -e^{-i\phi-i\varphi}\sin\theta\cos\theta & -e^{i\phi+i\varphi}\sin\theta\cos\theta & \sin^2\theta \\ e^{-i\phi+i\varphi}\sin\theta\cos\theta & e^{-2i\phi}\cos^2\theta & -e^{2i\varphi}\sin^2\theta & -e^{-i\phi+i\varphi}\sin\theta\cos\theta \\ e^{i\phi-i\varphi}\sin\theta\cos\theta & -e^{-2i\varphi}\sin^2\theta & e^{2i\phi}\cos^2\theta & -e^{i\phi-i\varphi}\sin\theta\cos\theta \\ \sin^2\theta & e^{-i\phi-i\varphi}\sin\theta\cos\theta & e^{i\phi+i\varphi}\sin\theta\cos\theta & \cos^2\theta \end{bmatrix}$$

Matrix (M) may be non-singular, and its inverse may be as shown in the following equation (Equation 12).

(Equation 12)
$$M^{-1} = \frac{1}{2}\begin{bmatrix} 1+\cos 2\theta & e^{i\phi-i\varphi}\sin 2\theta & e^{-i\phi+i\varphi}\sin\theta\cos\theta & 1-\sin 2\theta \\ -e^{i\phi+i\varphi}\sin 2\theta & e^{-2i\phi}(\cos 2\theta+1) & e^{2i\varphi}(\sin 2\theta-1) & e^{i\phi+i\varphi}\sin 2\theta \\ -e^{-i\phi-i\varphi}\sin 2\theta & e^{-2i\varphi}(\cos 2\theta-1) & e^{-2i\phi}(\cos 2\theta+1) & e^{-i\phi-i\varphi}\sin 2\theta \\ 1-\cos 2\theta & -e^{i\phi-i\varphi}\sin 2\theta & -e^{-i\phi+i\varphi}\sin 2\theta & 1+\cos 2\theta \end{bmatrix}$$

Matrix ($M^{-1}$) may represent coefficients that may weigh outputs from eight differential amplifiers (e.g., differential transimpedance amplifier array 320) to generate the eight mixtures set forth in Equations 7-10. However, mixing of bits within the same polarization may be represented by a first and last row of matrix ($M^{-1}$), rewritten as matrix (S), in the following equation (Equation 13).

$$S = \frac{1}{2}\begin{bmatrix} 1+\cos 2\theta & e^{i\phi-i\varphi}\sin 2\theta & e^{-i\phi+i\varphi}\sin 2\theta & 1-\cos 2\theta \\ 1-\cos 2\theta & -e^{i\phi-i\varphi}\sin 2\theta & -e^{-i\phi+i\varphi}\sin 2\theta & 1+\cos 2\theta \end{bmatrix} \quad \text{(Equation 13)}$$

The matrix elements in matrix (S) may correspond to signals $S_{11}$, $S_{21}$, $S_{12}$, $S_{22}$, $S_{13}$, $S_{23}$, $S_{14}$, and $S_{24}$, described above. For example, signal $S_{11}$ may correspond to ½(1+cos 2θ), signal $S_{21}$ may correspond to ½(1−cos 2θ), signal $S_{12}$ may correspond to ½($e^{i\phi-i\varphi}$ sin 2θ), signal $S_{22}$ may correspond to ½($-e^{i\phi-i\varphi}$ sin 2θ), signal $S_{13}$ may correspond to ½($e^{-i\phi+i\varphi}$ sin 2θ), signal $S_{23}$ may correspond to ½($-e^{-i\phi+i\varphi}$ sin 2θ), signal $S_{14}$ may correspond to ½(1−cos 2θ), and signal $S_{24}$ may correspond to ½(1+cos 2θ).

Although FIG. 6 shows exemplary components of signal processor 330, in other implementations, signal processor 330 may contain fewer, different, or additional components than depicted in FIG. 6. In still other implementations, one or more components of signal processor 330 may perform one or more other tasks described as being performed by one or more other components of signal processor 330. Furthermore, a wide variety of MIMO signal processing architectures may be used instead of the MIMO signal processing architecture depicted in signal processor 330. In one example, digital signal processing may be substituted for the analog signal processing described above by converting the analog data streams to digital data streams at some point in the signal processing chain.

Exemplary Feedback Processor/Data Recovery Configuration

Figure 7:
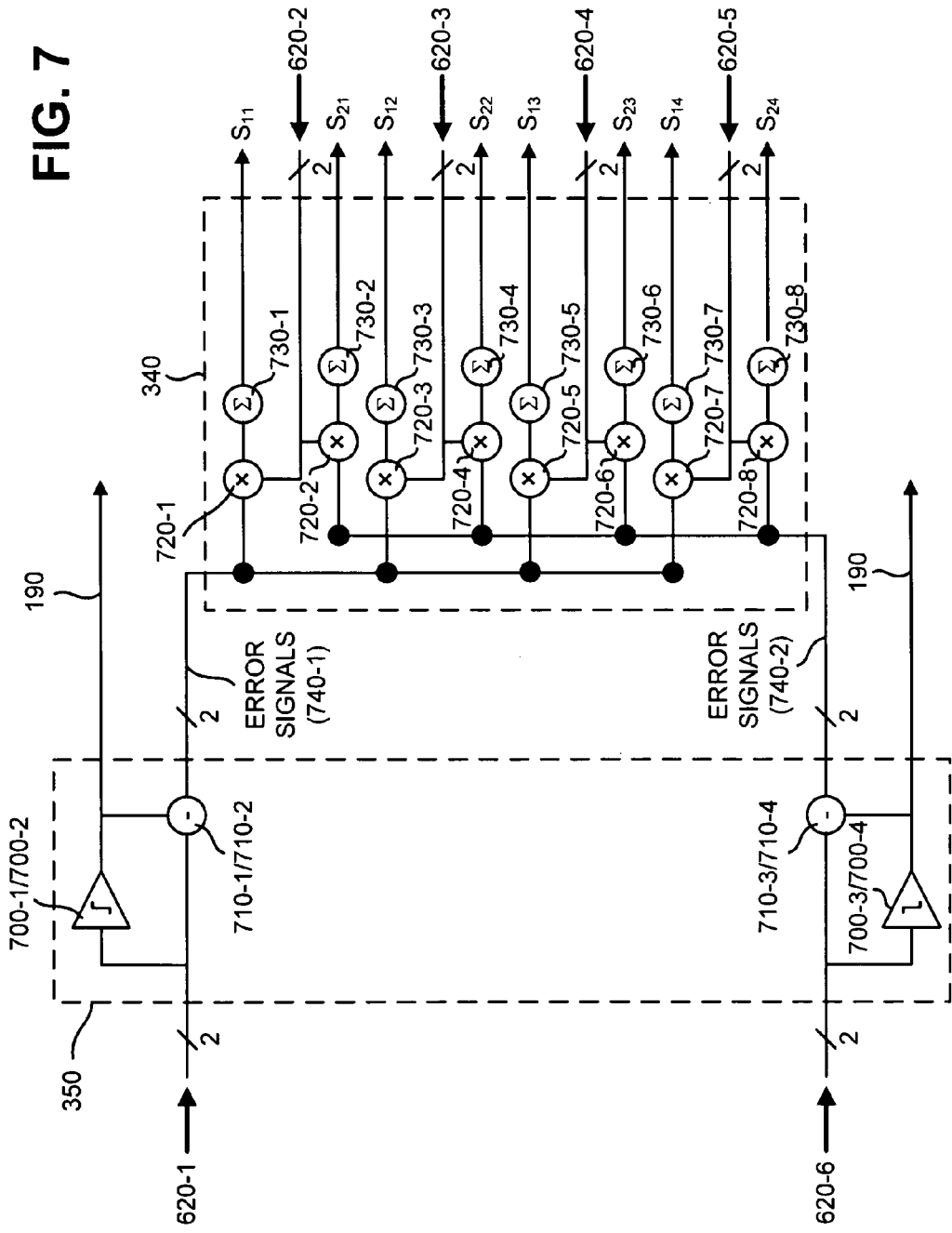
FIG. 7 depicts a diagram of exemplary components of a feedback processor and data recovery of the optical receiver illustrated in FIG. 3.

FIG. 7 depicts a diagram of exemplary components of feedback processor 340 and data recovery 350, and interrelations among the exemplary components. While the mathematical formalism of Equation 13 may be used to compute the appropriate MIMO gain settings to apply for any given Jones matrix introduced the line system (e.g., optical fiber 140), actually obtaining the Jones matrix elements may be difficult in real time. Thus, in one implementation, signal processing may be performed on the received data streams to determine optimal MIMO gain settings.

As illustrated, data recovery 350 may include one or more limiting amplifiers 700-1, 700-2, 700-3, and 700-4 (collectively referred to as "limiting amplifiers 700" and singularly as "limiting amplifier 700"), and one or more linear subtraction elements 710-1, 710-2, 710-3, and 710-4 (collectively referred to as "linear subtraction elements 710" and singularly as "linear subtraction element 710"). Feedback processor 340 may include one or more gain elements 720-1, ..., 720-8 (collectively referred to as "gain elements 720" and singularly as "gain element 720"), and one or more low pass filters 730-1, ..., 730-8 (collectively referred to as "low pass filters 730" and singularly as "low pass filter 730"). In one implementation, the components of feedback processor 340 may perform a least-mean squares (LMS) algorithm. In other implementations, feedback processor 340 may utilize feedback mechanisms (e.g., a forward error correction (FEC) encoding, which approximates a bit-error ratio for a data stream) in addition to the LMS algorithm. In still other implementations, other means of encoding the individual data streams may be used to determine the residual crosstalk components in the outputs of the MIMO processor (e.g., signal processor 330), such as encoding each data stream with tones or unique digital bit streams within each data stream.

Limiting amplifier 700 may include a device that receives an input signal (e.g., an analog data signal), and outputs a particular output signal. For example, limiting amplifier 700 may receive an incoming analog data signal (e.g., that is either +1 volt or −1 volt), and may output a particular signal (e.g., that is either +1 volt or −1 volt). However, if a gain on limiting amplifier 700 is off by a small amount (e.g., "z"), limiting amplifier 700 may receive an incoming analog signal (e.g., that is either +1+z or −1+z), and may still output the particular signal (e.g., that is either +1 volt or −1 volt). The small amount (e.g., "z") may be considered an error signal. For example, as shown in FIG. 7, limiting amplifier 700-1 may receive one signal of mixed electrical signal pair 620-1, limiting amplifier 700-2 may receive another signal of mixed electrical signal pair 620-1, limiting amplifier 700-3 may receive one signal of mixed electrical signal pair 620-6, and limiting amplifier 700-4 may receive another signal of mixed electrical signal pair 620-6. Mixed electrical signal pairs 620-1 and 620-6 and limiting amplifiers 700 may be used to calculate error signals, as described below.

Linear subtraction element 710 may include a device that receives two signals (e.g., analog signals) and produces an output that is a linear difference of the two signals. As further shown in FIG. 7, linear subtraction element 710-1 may receive two signals (e.g., an input and an output signal of limiting amplifier 700-1), and may produce an output (e.g., one of error signals 740-1) that is a linear difference of the two signals. Linear subtraction element 710-2 may receive two signals (e.g., an input and an output signal of limiting amplifier 700-2), and may produce an output (e.g., another one of error signals 740-1) that is a linear difference of the two signals. Linear subtraction element 710-3 may receive two signals (e.g., an input and an output signal of limiting amplifier 700-3), and may produce an output (e.g., one of error signals 740-2) that is a linear difference of the two signals. Linear subtraction element 710-4 may receive two signals (e.g., an input and an output signal of limiting amplifier 700-4), and may produce an output (e.g., another one of error signals 740-2) that is a linear difference of the two signals.

Gain element 720 may include a device that receives four signals (e.g., analog signals) and produces an output that is a complex product of the four signals. A complex multiplier stage may be implemented as follows. The output in-phase (I) component may be a product of the first input's in-phase (I) and second input's in-phase (I) component, minus a product of the first input's quadrature-phase (Q) and second input's quadrature-phase (Q) component. The output quadrature-phase (Q) component may be a product of the first input's in-phase (I) and second input's quadrature-phase (Q) component, plus a product of the first input's quadrature-phase (Q) and second input's in-phase (I) component. In one implementation, gain element 720 may include an analog multiplier, a voltage-controlled amplifier, voltage-controlled attenuator, etc.

As further shown in FIG. 7, gain element 720-1 may receive four signals (e.g., the two error signals 740-1 and the mixed electrical signal pair 620-2), may multiply the four signals, and may output the complex product of the four signals (e.g., to low pass filter 730-1). Gain element 720-2 may receive four signals (e.g., the two error signals 740-2 and the mixed electrical signal pair 620-2), may multiply the four signals, and may output the complex product of the four signals (e.g., to low pass filter 730-2). Gain element 720-3 may receive four signals (e.g., the two error signals 740-1 and the mixed electrical signal pair 620-3), may multiply the four signals, and may output the complex product of the four signals (e.g., to low pass filter 730-3). Gain element 720-4 may receive four signals (e.g., the two error signals 740-2 and the mixed electrical signal pair 620-3), may multiply the four signals, and may output the complex product of the four signals (e.g., to low pass filter 730-4). Gain element 720-5 may receive four signals (e.g., the two error signals 740-1 and the mixed electrical signal pair 620-4), may multiply the four signals, and may output the complex product of the four signals (e.g., to low pass filter 730-5). Gain element 720-6 may receive four signals (e.g., the two error signals 740-2 and the mixed electrical signal pair 620-4), may multiply the four signals, and may output the complex product of the four signals (e.g., to low pass filter 730-6). Gain element 720-7 may receive four signals (e.g., the two error signals 740-1 and the mixed electrical signal pair 620-5), may multiply the four signals, and may output the complex product of the four signals (e.g., to low pass filter 730-7). Gain element 720-8 may receive four signals (e.g., the two error signals 740-2 and the mixed electrical signal pair 620-5), may multiply the four signals, and may output the complex product of the four signals (e.g., to low pass filter 730-8).

Low pass filter 730 may include a device (e.g., a filter) that passes low-frequency signals but attenuates (i.e., reduces amplitudes of) signals with frequencies higher than a cutoff frequency. A low-pass filter operating on a signal with both in-phase (I) and quadrature-phase (Q) components may be implemented as separate low pass filters on each of these components. In one implementation, the low-pass filter may be an integrator. In another implementation, the low-pass filter may be a digital accumulator. For example, as shown in FIG. 7, low pass filter 730-1 may receive a signal from gain element 720-1, may attenuate the signal (if necessary), and may output the signal (e.g., as signal $S_{11}$). Low pass filter 730-2 may receive a signal from gain element 720-2, may attenuate the signal (if necessary), and may output the signal (e.g., as signal $S_{21}$). Low pass filter 730-3 may receive a signal from gain element 720-3, may attenuate the signal (if necessary), and may output the signal (e.g., as signal $S_{12}$). Low pass filter 730-4 may receive a signal from gain element 720-4, may attenuate the signal (if necessary), and may output the signal (e.g., as signal $S_{22}$). Low pass filter 730-5 may receive a signal from gain element 720-5, may attenuate the signal (if necessary), and may output the signal (e.g., as signal $S_{13}$). Low pass filter 730-6 may receive a signal from gain element 720-6, may attenuate the signal (if necessary), and may output the signal (e.g., as signal $S_{23}$). Low pass filter 730-7 may receive a signal from gain element 720-7, may attenuate the signal (if necessary), and may output the signal (e.g., as signal $S_{14}$). Low pass filter 730-8 may receive a signal from gain element 720-8, may attenuate the signal (if necessary), and may output the signal (e.g., as signal $S_{24}$). Signals $S_{11}$ $S_{21}$, $S_{12}$, $S_{22}$, $S_{13}$, $S_{23}$, $S_{14}$, and $S_{24}$ may be provided by feedback processor 340 to signal processor 330.

In operation, linear subtraction elements 710-1 and/or 710-2 may generate error signals (e.g., error signals 740-1) if a difference is calculated for the input and output signals of limiting amplifiers 700-1 and/or 700-2. Linear subtraction elements 710-3 and/or 710-4 may generate error signals (e.g., error signals 740-2) if a difference is calculated for the input and output signals of limiting amplifiers 700-3 and/or 700-4. Error signals 740-1 and/or 740-2 may be provided to feedback processor 340, and feedback processor 340 may adjust one or more gain elements 720 (which may adjust one or more signals $S_{11}$, $S_{21}$, $S_{12}$, $S_{22}$, $S_{13}$, $S_{23}$, $S_{14}$, and $S_{24}$ provided to signal processor 330) until error signals 740-1/740-2 are minimized (e.g., below a particular threshold) and/or eliminated. If error signals 740-1/740-2 are minimized and/or eliminated, one or more limiting amplifiers 700 may output data signals (e.g., data 190), which may be independent of a polarization and/or carrier frequency of an optical signal received by optical receiver 170. Minimization and/or elimination of error signals 740-1/740-2 may also open an "eye" of optical receiver 170 in a least-mean squares sense.

The LMS algorithm provided by feedback control 340 may provide a quick signal recovery that may be sufficient for tracking either polarization effects or transients introduced by single channel failures in a transit optical fiber (e.g., optical fiber 140). The LMS algorithm may reject crosstalk, and coupling coefficients utilized by the LMS algorithm may be analyzed and used as inputs to a filter alignment algorithm (e.g., provided by one or more components of optical receiver 170).

The arrangement of optical receiver 170 described herein may enable determination of a direction and a magnitude of a DQPSK demodulation filter offset (e.g., via tap coefficients), which may eliminate a need for a dither (e.g., an optical power limit can be increased by dithering a transmit optical center frequency) to be applied to the DQPSK demodulation filter. The arrangement of optical receiver 170 may improve tolerance to filter alignment, which may be utilized in multi-channel optical receivers. In one implementation, choices of update algorithms, data sampling, precision for error or correlation feedback paths, use of tones or training sequences for setting tap coefficients, etc. may be optimized depending on a particular implementation.

In many cases, the MIMO signal processing may eliminate the need for the phase of a single bit delay to be aligned to the phase of the carrier signal. In this case, optical receiver 170 may be configured without phase controls. For example, optical signal processing may be done with a Planar Lightwave Circuit (PLC) without requiring fine tuning of optical phases within the PLC. Compared to coherent optical receivers, optical receiver 170 may be less sensitive to phase noise of optical transmitter 110 and a local oscillator receiver. Furthermore, transient changes in a frequency of optical transmitter 110 may be tracked using the LMS algorithm rather than other optical approaches. Compared to optical polarization demultiplexing, the problem of tracking changes to the Jones matrix (Equation 4) is more traceable with the electronics of optical receiver 170 than with other optical approaches.

Although FIG. 7 shows exemplary components of feedback processor 340 and data recovery 350, in other implementations, feedback processor 340 and/or data recovery 350 may contain fewer, different, or additional components than depicted in FIG. 7. In still other implementations, one or more components of feedback processor 340 and/or data recovery 350 may perform one or more other tasks described as being performed by one or more other components of feedback processor 340 and/or data recovery 350.

Figure 8:
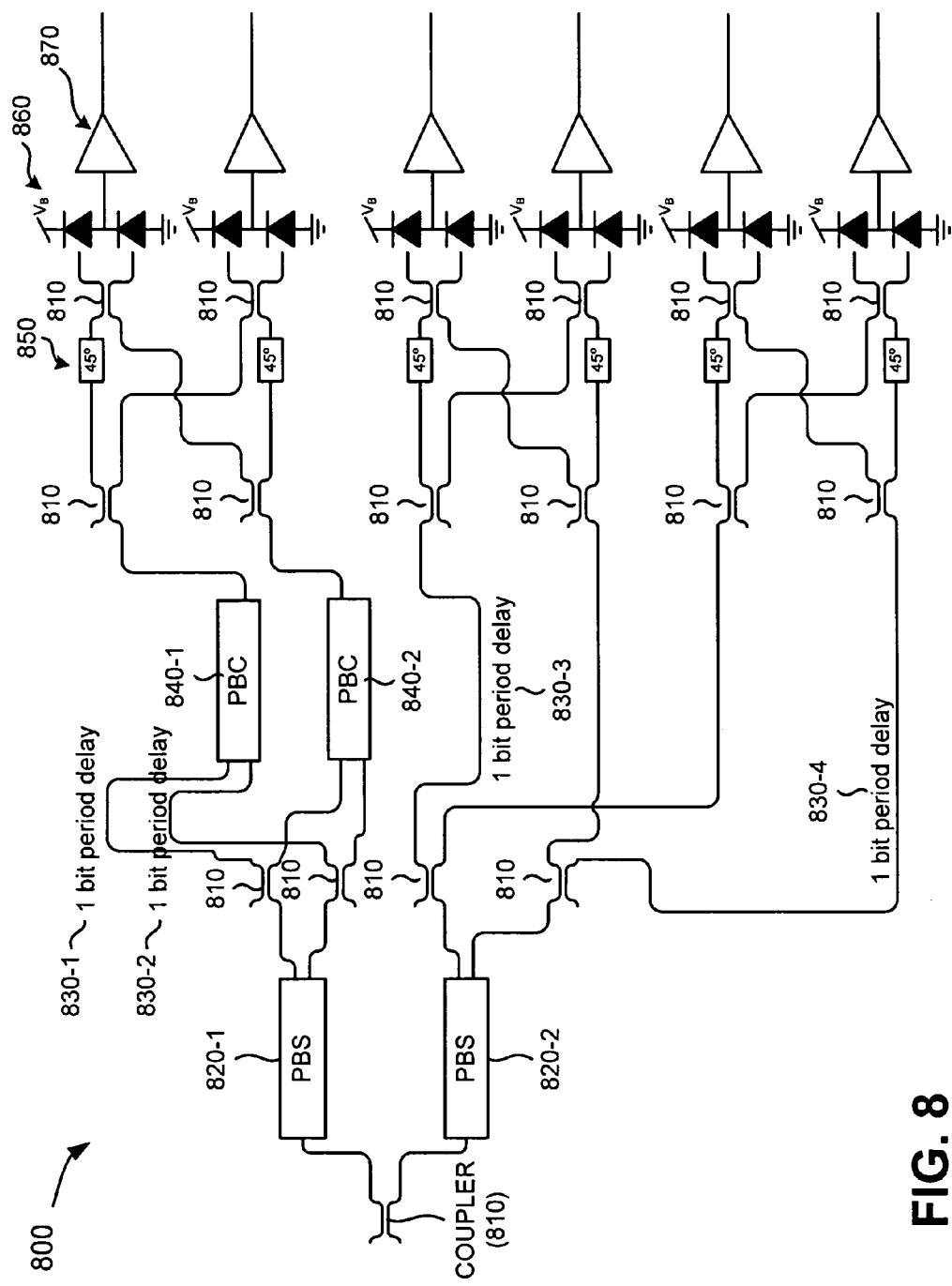
FIG. 8 illustrates a diagram of an alternative arrangement of components of the optical receiver depicted in FIG. 3.

Alternative Optical Processor/Optical Detector Array/Differential Amplifier Array Configuration FIG. 8 illustrates a diagram of an alternative arrangement 800 of components (e.g., the optical processor, optical detector array, and/or differential amplifier array) of optical receiver 170. As shown, arrangement 800 may include one or more couplers 810, polarization beam splitters (PBS) 820-1 and 820-2, interferometers 830-1, 830-2, 830-3, and 830-4 (collectively referred to as "interferometers 830" and singularly as "interferometer 830"), polarization beam combiners (PBC) 840-1 and 840-2, one or more optical phase rotators 850, an optical detector array 860, and a differential amplifier array 870. Each of couplers 810 may include an optical device (e.g., an optical coupler) that splits optical signals into multiple paths, or combines multiple optical signals into a single path. In one implementation, for example, each of couplers 810 may include an optical splitter (e.g., an optical device that splits an optical signal into multiple paths of optical signals), a wavelength division multiplexer (WDM) (e.g., an optical device that permits two or more different wavelengths of optical signals to be split into multiple paths or combined onto a single path), a fused fiber coupler, etc. As further shown in FIG. 8, couplers 810 may split optical signals into multiple paths. For example, coupler 810 (to the far left in FIG. 8) may receive optical signal (e.g., optical signal 240), and may split the optical signal into two paths. A first path may be provided to polarization beam splitter 820-1, and a second path may be provided to polarization beam splitter 820-2.

Each of polarization beam splitters 820-1 and 820-2 may include an optical device that splits a received optical signal into two optical signals of differing polarization. In one implementation, for example, each of polarization beam splitters 820-1 and 820-2 may receive an optical signal from coupler 810 (to the far left in FIG. 8), and may split the optical signal into two optical signals of differing polarization (e.g., into a transverse electrical ($T_E$) optical signal and a transverse magnetic ($T_M$) optical signal).

Each of interferometers 830 may include an optical device (e.g., a bit-delay interferometer) that delays an optical signal by a period (e.g., one bit period delay) to produce an optical signal with a one bit period delay. In one implementation, interferometers 830 may be provided before optical waveguide 160 or before polarization splitting structures (e.g., polarization beam splitters 820-1 and 820-2). As further shown in FIG. 8, other optical signals may not be delayed by a period, and may be considered current bit optical signals.

Each of polarization beam combiners 840-1 and 840-2 may include an optical device that receives two orthogonal polarized optical signals, and combines the two optical signals into one output optical signal. In one implementation, for example, polarization beam combiner 840-1 may receive two orthogonal polarized optical signals (e.g., one optical signal from interferometer 830-1 and one optical signal interferometer 830-2), and may combine the two optical signals into one output optical signal. Polarization beam combiner 840-2 may receive two orthogonal polarized optical signals (e.g., from polarization beam splitter 820-1), and may combine the two optical signals into one output optical signal.

Each of optical phase rotators 850 may include an optical device that introduces a small delay to an optical signal, corresponding to an optical phase change (e.g., a particular number of degrees), as the optical signal passes through the device. In one implementation, each of optical phase rotators 850 may delay an optical signal by forty-five (45) degrees in phase as the optical signal passes through optical phase rotator 850.

Optical detector array 860 may include an array of one or more optical detector pairs. Each optical detector pair may include a pair of optical detectors that may convert one or more optical signals into one or more electrical signals (e.g., by generating an electrical current proportional to an intensity of incident optical radiation). In one exemplary implementation, each optical detector may include a photodiode, such as a semiconductor positive-intrinsic-negative (PIN) photodiode, an avalanche photodiode (APD), etc. In one implementation, each optical detector pair may receive a corresponding one of mixed optical signal pairs, may convert the corresponding mixed optical signal pair into a mixed electrical signal pair, and may provide the mixed electrical signal pair to a corresponding one of differential amplifiers (e.g., of differential amplifier array 870).

Differential amplifier array 870 may include an array of one or more differential amplifiers. Each differential amplifier may include a device that may receive mixed electrical signals from a corresponding optical detector pair (e.g., provided by optical detector array 860), and may multiply a difference between two inputs (e.g., mixed electrical signals) by a constant factor (e.g., a differential gain). Each differential amplifier may output a signal (e.g., an in-phase (I) signal or a quadrature-phase (Q) signal) based on the received mixed electrical signals.

In operation, arrangement 800 may perform functions similar to the functions described above in connection with optical processor 300, optical detector array 310, and differential transimpedance amplifier array 320. However, arrangement 800 may reduce optical over sampling by taking advantage of symmetries provided in matrix ($M^{-1}$) of Equation 12. Specifically, if data is encoded such that a phase difference is examined between a current bit and an opposite polarization of a previous bit, four identical gain terms (to within a sign) in matrix ($M^{-1}$) may be used. Since the gain terms may be identical, arrangement 800 may not need to use separate amplifiers for the transverse electrical ($T_E$) and the transverse magnetic ($T_M$) mixed terms. Arrangement 800 may thus be simplified to six inputs and four outputs, and may use the feedback mechanisms described above (e.g., feedback processor 340 and data recovery 350).

Although FIG. 8 shows exemplary components of arrangement 800, in other implementations, arrangement 800 may contain fewer, different, or additional components than depicted in FIG. 8. In still other implementations, one or more components of arrangement 800 may perform one or more other tasks described as being performed by one or more other components of arrangement 800.

Exemplary Operation of Optical Receiver

In an exemplary operation, optical processor 300 of optical receiver 170 may receive a first optical signal (e.g., optical signal 240) that may include multiple bits, and may output multiple second optical signals (e.g., signal pairs 480-1, . . . , 480-8). Each of the second optical signals (e.g., signal pairs 480-1, . . . , 480-8) may include a corresponding one of multiple first optical components (e.g., optical signals based on previous bit optical signal 450-1, as shown in FIG. 4) that may be delayed relative to the first optical signal (e.g., optical signal 240). Each of the second optical signals (e.g., signal pairs 480-1, . . . , 480-8) may also include a corresponding one of multiple second optical components (e.g., optical signals based on current bit optical signal 450-2, as shown in FIG. 4). In one implementation, one or more of the second optical components may include a phase or a polarization that is different than a phase or a polarization, respectively, of the first optical signal (e.g., optical signal 240). For example, as shown in FIG. 4, optical signals based on current bit optical signal 450-2 may be rotated based on polarization planes (e.g., via polarization rotators 430), and may be rotated based on phase (e.g., via optical phase rotators 440) in order to produce multiple signal pairs 480-1, . . . , 480-8. In another implementation, one or more of the second optical components may result from a combination or a splitting of portions of the first optical signal (e.g., optical signal 240). For example, as shown in FIG. 4, portions of optical signal 240 may be combined and/or split (e.g., via couplers 420 or polarization beam splitters 420) in order to produce multiple signal pairs 480-1, . . . , 480-8.

As shown in FIG. 5, optical detector array 310 of optical receiver 170 may include multiple photodiodes (e.g., optical detector pairs 500-1, . . . , 500-8) configured to receive the second optical signals (e.g., signal pairs 480-1, . . . , 480-8), and generate multiple electrical signals (e.g., signals exiting optical detector pairs 500-1, . . . , 500-8) in response thereto. As shown in FIG. 6, signal processor 330 of optical receiver 170 may receive the electrical signals (e.g., complex signals 520-1, . . . , 520-4), and may output electrical signal pairs 620-1 and 620-6 to feedback processor 340 and data recovery 350 of optical receiver 170. In one implementation, as shown in FIG. 7, data recovery 350 may output the multiple bits (e.g., data 190) based on a first one of the electrical signals (e.g., signal pairs 620-1 and 620-6) being scaled in accordance with a gain (e.g., gains on gain on limiting amplifiers 700-1, . . . 700-4). In another implementation, as shown in FIG. 7, data recovery 350 may output the multiple bits (e.g., data 190) based on a combination of first and second ones of the electrical signals (e.g., signal pairs 620-1, . . . , 620-6), which have been added, subtracted, or delayed relative to one another by a delay time period (e.g., via one or more components of signal processor 330, feedback processor 340, and/or data recovery 350, as shown in FIGS. 6 and 7).

When the multiple bits (e.g., data 190) are output based on the first one of the electrical signals being scaled in accordance with the gain, feedback processor 340 and data recovery 350 (e.g., via linear subtraction elements 710, gain elements 720, and/or low pass filters 730) may adjust the gain in accordance with a variation in the polarization of the first optical signal (e.g., optical signal 240) or a variation in a wavelength of the first optical signal (e.g., optical signal 240). When the multiple bits (e.g., data 190) are output based on the first and second ones of the electrical signals being delayed relative to one another by the delay time period, feedback processor 340 and data recovery 350 (e.g., via linear subtraction elements 710, gain elements 720, and/or low pass filters 730) may adjust the delay time period in accordance with the variation in the polarization of the first optical signal (e.g., optical signal 240) or the variation in a wavelength of the first optical signal (e.g., optical signal 240).

Exemplary Simulations

Figure 9A:
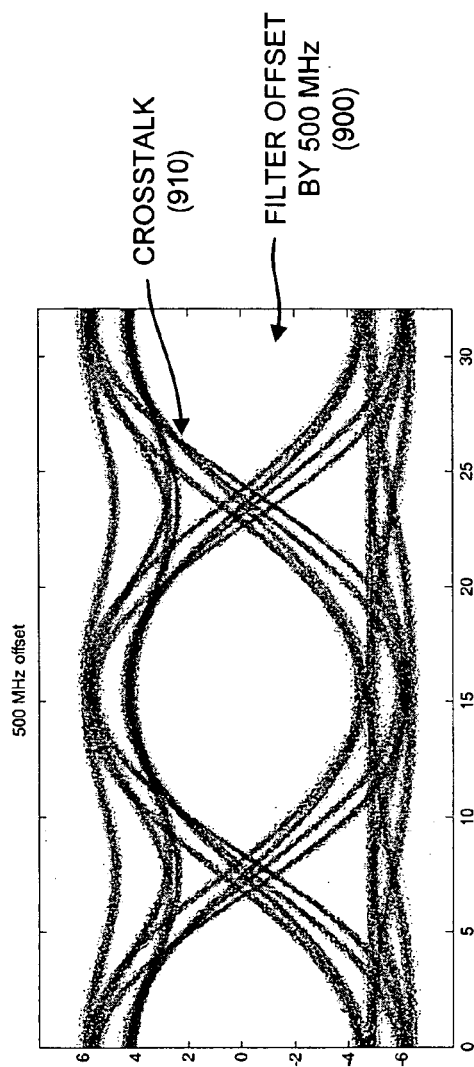
FIGS. 9A and 9B depict exemplary graphs of simulated eyes and electronic removal of crosstalk via the optical receiver depicted in FIG. 3.
Figure 9B:
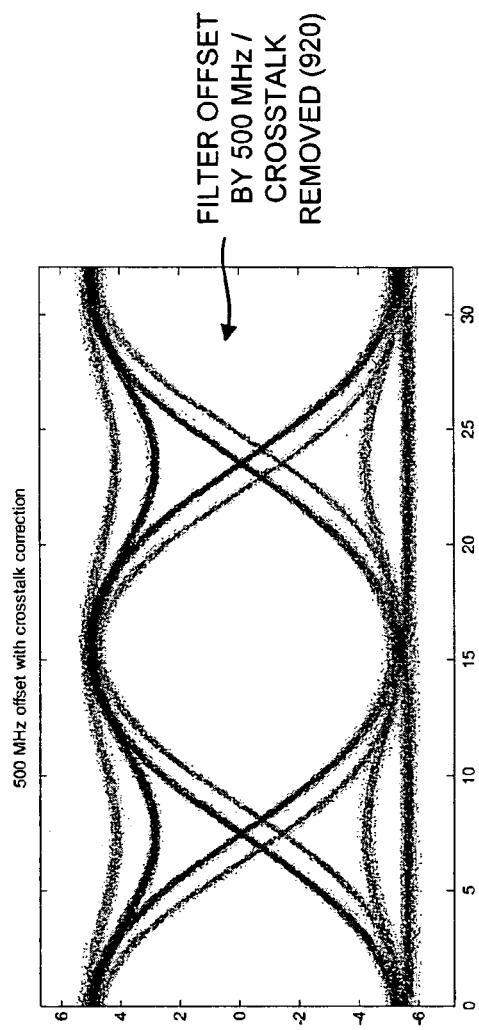

FIGS. 9A and 9B depict exemplary graphs of simulated eyes and electronic removal of crosstalk via optical receiver 170. In this simulation, an optical transmitter may modulate a single carrier using DQPSK modulation. An optical receiver may demodulate the optical signal using a delay interferometer, where the phase difference in the bit delay is not tuned correctly. FIG. 9A may depict a graph of a received optical signal, where the optical delay interferometer is not aligned with the optical transmitter (e.g., a filter of the standard optical receiver is offset by five-hundred MHz), as indicated by reference number 900. As further shown in FIG. 9A, the optical signal may include crosstalk 910 introduced by the misalignment of the delay interferometer.

FIG. 9B may depict a graph of an optical signal received by optical receiver 170. The optical signal may include the same optical signal received by the standard optical receiver described above in connection with FIG. 9A. However, optical receiver 170 may remove crosstalk 910 from the optical signal, as indicated by reference number 920. As further shown in FIG. 9B, a received eye may be fully open when a misaligned filter's crosstalk is electronically removed (e.g., by optical receiver 170).

Figure 9C:
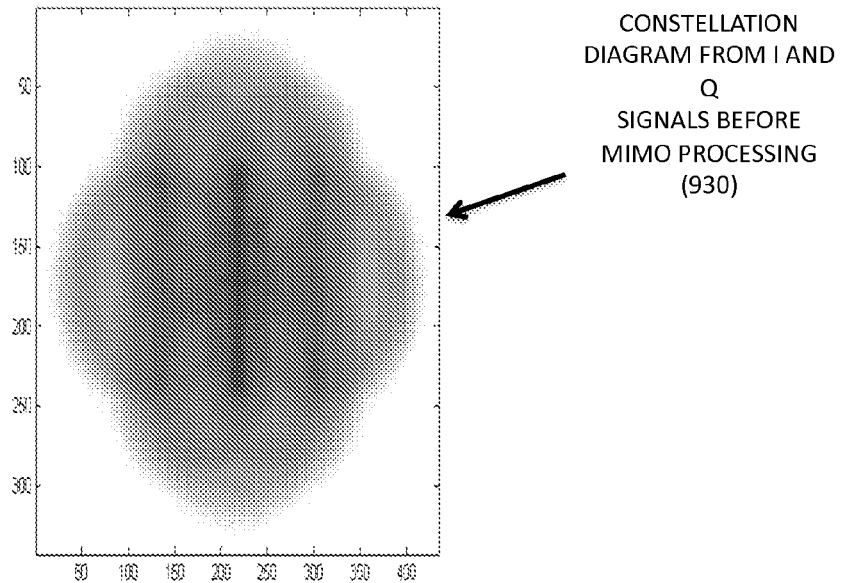
FIGS. 9C and 9D illustrate exemplary constellation diagrams before and after electronic processing via the optical receiver depicted in FIG. 3.
Figure 9D:
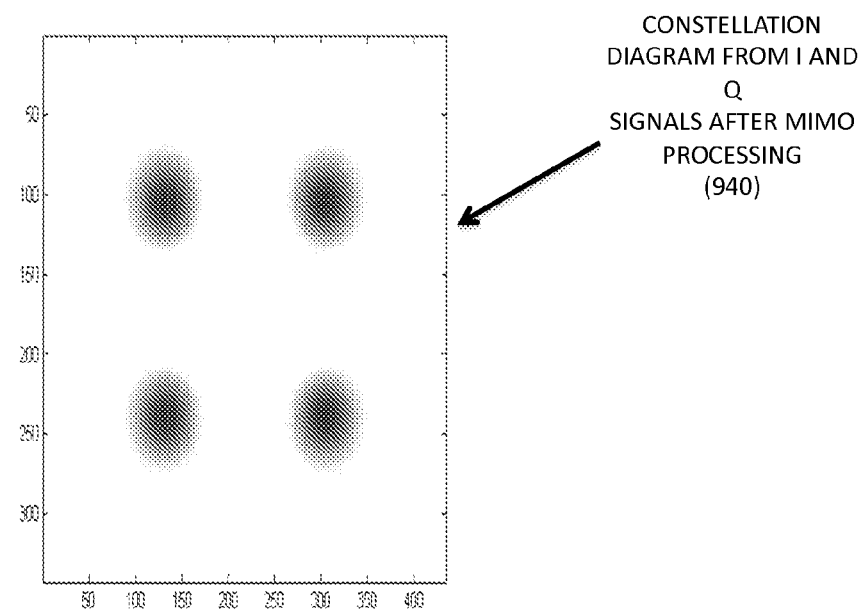

FIGS. 9C and 9D illustrate exemplary constellation diagrams before and after electronic processing via optical receiver 170. FIG. 9C depicts a constellation diagram 930 from in-phase (I) and quadrature-phase (Q) signals before MIMO processing by optical receiver 170. As further shown in FIG. 9C, constellation diagram 930 may not provide discernable signals. FIG. 9D depicts a constellation diagram 940 from in-phase (I) and quadrature-phase (Q) signals after MIMO processing by optical receiver 170. As further shown in FIG. 9D, the MIMO processing by optical receiver 170 may provide four discernable signals in constellation diagram 940.

Exemplary Process

Figure 10:
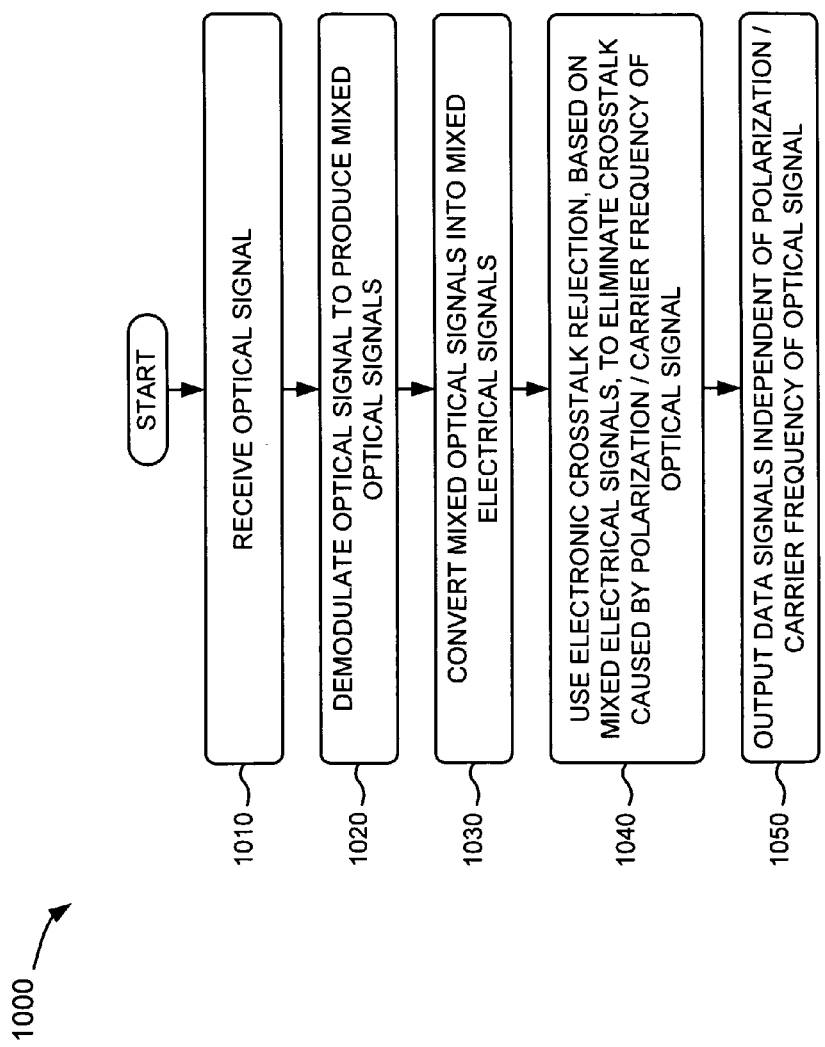

FIGS. 10-12 depict a flow chart of an exemplary process 1000 that utilizes electronic crosstalk rejection and DQPSK demodulation to relax requirements on filter misalignment with a carrier wave and to enable electronic polarization demultiplexing of optical signals, according to implementations described herein. In one implementation, process 1000 may be performed by optical receiver 170. In another implementation, some or all of process 1000 may be performed by another device or group of devices, including or excluding optical receiver 170.

As illustrated in FIG. 10, process 1000 may begin with receipt of an optical signal (block 1010), and demodulation of the optical signal to produce mixed optical signals (block 1020). For example, in implementations described above in connection with FIG. 3, optical processor 300 of optical receiver 170 may receive an optical signal (e.g., optical signal 240), and may split the optical signal into a current bit optical signal and a previous bit optical signal. Optical processor 300 may polarize and split (e.g., demodulate) the current bit optical signal and the previous bit optical signal, and may combine the polarized and split current bit optical signal with the polarized and split previous bit optical signal to produce one or more mixed optical signals.

As further shown in FIG. 10, the mixed optical signals may be converted into mixed electrical signals (block 1030). For example, in implementations described above in connection with FIG. 3, optical detector array 310 of optical receiver 170 may include an array of one or more optical detectors. Each optical detector may receive a corresponding one of the one or more mixed optical signals, and may convert the mixed optical signal into a mixed electrical signal (e.g., by generating an electrical current proportional to an intensity of incident optical radiation).

Returning to FIG. 10, electronic crosstalk rejection may be used, based on the mixed electrical signals, to eliminate or reduce crosstalk caused by polarization and/or a carrier frequency of the optical signal (block 1040). For example, in implementations described above in connection with FIG. 3, signal processor 330 of optical receiver 170 may electronically reduce or eliminate crosstalk between data signals (e.g., one or more mixed electrical signals). In one example, signal processor 330 may use multiple-input multiple-output (MIMO) signal processing to reduce crosstalk between data signals. Feedback processor 340 of optical receiver 170 may detect a correlation between received data streams (e.g., data streams provided by signal processor 330). In one example, feedback processor 340 may use a least-mean squares (LMS) algorithm to detect a correlation between received data streams. Feedback processor 340 may receive data streams from signal processor 330, and may use a LMS algorithm to detect a correlation between the data streams. Feedback processor 340 may receive one or more error signals based on a difference between the data streams received from signal processor 330 and recovered data streams (e.g., data 190). The LMS algorithm may determine MIMO filter coefficients that produce the least-mean squares of the error signals. Feedback processor 340 may provide feedback to signal processor 330 until the error signals are minimized (e.g., below a particular threshold) and/or eliminated. Once the error signals are minimized and/or eliminated, the originally transmitted data stream may be robustly reproduced at optical receiver 170.

Returning to FIG. 10, data signals may be output independent of the polarization and/or carrier frequency of the optical signal (block 1050). For example, in implementations described above in connection with FIG. 3, data recovery 350 of optical receiver 170 may generate error signals based on a difference between the data streams received from signal processor 330 and recovered data streams (e.g., data 190). Data recovery 350 may output recovered data streams (e.g., data 190) if the error signals are minimized (e.g., below a particular threshold) and/or eliminated. In one example, data recovery 350 may include one or more limiting amplifiers. Each limiting amplifier may receive data streams from signal processor 330, and may limit a voltage (e.g., an upper voltage limit and a lower voltage limit) of an output signal. Each limiting amplifier may generate data 190 (e.g., a ten (10) G/s data stream) without crosstalk if the error signals are minimized (e.g., below a particular threshold) and/or eliminated.

Process block 1020 may include the process blocks depicted in FIG. 11. As shown in FIG. 11, process block 1020 may begin with a splitting of the optical signal into a current bit optical signal and a previous bit optical signal (block 1100). For example, in implementations described above in connection with FIG. 4, couplers 410 of optical processor 300 may split optical signals into multiple paths. In one example, coupler 410 (to the far left in FIG. 4) may receive optical signal 240, and may split optical signal 240 into two paths. A first path may be delayed by a period (e.g., one bit period delay via a bit-delay interferometer) to produce previous bit optical signal 450-1, and a second path may not be delayed to produce current bit optical signal 450-2.

As further shown in FIG. 11, the current bit optical signal may be polarized and/or split into first and second current bit optical signals (block 1110), and the previous bit optical signal may be polarized and/or split into first and second previous bit optical signals (block 1120). For example, in implementations described above in connection with FIG. 4, each of polarization beam splitters 420 of optical processor 300 may split a received optical signal into two optical signals of differing polarization. In one example, polarization beam splitter 420-1 may receive previous bit optical signal 450-1, and may split previous bit optical signal 450-1 into two optical signals of differing polarization (e.g., a first transverse electrical ($T_E$) optical signal 460 and a first transverse magnetic ($T_M$) optical signal 470). Polarization beam splitter 420-2 may receive current bit optical signal 450-2, and may split current bit optical signal 450-2 into two optical signals of differing polarization (e.g., a second transverse electrical optical signal 460 and a second transverse magnetic optical signal 470).

Returning to FIG. 11, the first and second current bit optical signals may be combined with the first and second previous bit optical signals to produce mixed optical signals (block 1130). For example, in implementations described above in connection with FIG. 4, optical signal 240 (e.g., which may be provided in a DQPSK modulation format) may be demodulated and/or demultiplxed by the arrangement of optical processor 300. In one example, first and second transverse electrical optical signals 460 and first and second transverse magnetic optical signals 470 may be optically split (e.g., via couplers 410) and rotated (e.g., via polarization rotators 430) in order to produce multiple mixed optical signal pairs (e.g., signal pairs 480-1, ..., 480-8). Optical processor 300 may provide the multiple mixed optical signal pairs (e.g., signal pairs 480-1, . . . , 480-8) to optical detector array 310 for further processing.

Process block 1040 may include the process blocks depicted in FIG. 12. As shown in FIG. 12, process block 1040 may begin with a determination of error signals associated with the mixed electrical signals (block 1200). For example, in implementations described above in connection with FIG. 7, limiting amplifier 700 of feedback processor 340 may receive an incoming analog data signal (e.g., that is either +1 volt or −1 volt), and may output a particular signal (e.g., that is either +1 volt or −1 volt). However, if a gain on limiting amplifier 700 is off by a small amount (e.g., "z"), limiting amplifier 700 may receive an incoming analog signal (e.g., that is either +1+z or −1+z), and may still output the particular signal (e.g., that is either +1 volt or −1 volt). The small amount (e.g., "z") may be considered an error signal. In one example, mixed electrical signal pairs 620-1 and 620-6 and limiting amplifiers 700 may be used to calculate error signals. Linear subtraction element 710 of feedback processor 340 may receive two signals (e.g., analog signals) and may produce an output that is a linear difference of the two signals. In one example, linear subtraction element 710-1 may receive two signals (e.g., an input and an output signal of limiting amplifier 700-1), and may produce an output (e.g., one of error signals 740-1) that is a linear difference of the two signals. Linear subtraction element 710-2 may produce another one of error signals 740-1, and linear subtraction elements 710-3 and 710-4 may produce error signals 740-2.

As further shown in FIG. 12, the mixed electrical signals may be modified until the error signals are eliminated (block 1210). For example, in implementations described above in connection with FIG. 7, gain element 720 of feedback processor 340 may receive four signals (e.g., analog signals) and may produce an output that is a complex product of the four signals. In one example, gain element 720-1 may receive four signals (e.g., the two error signals 740-1 and the mixed electrical signal pair 620-2), may multiply the four signals, and may output the complex product of the four signals (e.g., to low pass filter 730-1). Low pass filter 730 of feedback processor 340 may pass low-frequency signals but may attenuate signals with frequencies higher than a cutoff frequency. In one example, low pass filter 730-1 may receive a signal from gain element 720-1, may attenuate the signal (if necessary), and may output the signal (e.g., as signal $S_{11}$). Error signals 740-1 and/or 740-2 may be provided to feedback processor 340, and feedback processor 340 may adjust one or more gain elements 720 (which may adjust one or more signals $S_{11}$, $S_{21}$, $S_{12}$, $S_{22}$, $S_{13}$, $S_{23}$, $S_{14}$, and $S_{24}$ provided to signal processor 330) until error signals 740-1/740-2 are minimized (e.g., below a particular threshold) and/or eliminated.

Returning to FIG. 12, the data signals may be generated based on error-corrected mixed electrical signals (block 1220). For example, in implementations described above in connection with FIG. 7, if error signals 740-1/740-2 are minimized (e.g., below a particular threshold) and/or eliminated, one or more limiting amplifiers 700 may generate data signals (e.g., data 190), which may be independent of a polarization and/or carrier frequency of an optical signal received by optical receiver 170. Minimization and/or elimination of error signals 740-1/740-2 may also open an "eye" of optical receiver 170 in a least-mean squares sense.

Conclusion

Implementations described herein may provide an optical receiver that utilizes differential quadrature phase-shift keying (DQPSK) demodulation and electrical crosstalk rejection to relax requirements on filter misalignment with a carrier signal and to enable electronic polarization demultiplexing of optical signals. The optical receiver may include additional polarization state information when performing differential phase measurements on the optical signals. This may provide information that ensures that data can be recovered by the optical receiver regardless of the state of polarization introduced during transmission of the optical signals. DQPSK demodulation may provide a non-coherent scheme such that a reference or carrier signal may be unnecessary to determine a phase of a received signal. The optical receiver may over sample the optical signals (i.e., may examine more polarization states than the two orthogonal states provided by a polarization splitter). This may enable the optical receiver to perform electrical polarization demultiplexing of the optical signals (e.g., use electrical signal processing techniques to reverse the impact of the arbitrary polarization and carrier frequency of the incoming signal). The electrical crosstalk rejection may provide a tracking algorithm that isolates received optical signals, and reduces crosstalk between data sequences.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIGS. 10-12, the order of the blocks may be modified in other implementations. Further, non-dependent blocks may be performed in parallel. In other implementations, the optical receiver described herein may utilize other modulation schemes other than the differential quadrature phase-shift keying (DQPSK) modulation scheme. For example, the optical receiver may utilize a differential phase-shift keying (DPSK) modulation scheme, higher order DPSK modulation schemes, a quadrature amplitude modulation (QAM) modulation scheme, etc.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware can be designed to implement the embodiments based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "tone" or similar language is used. Further, the phrase "based on" is intended to mean "based, at least in part, on" unless explicitly stated otherwise.

What is claimed is:

1. A receiver, comprising:
   an optical processor circuit configured to:
      receive a first optical signal, which carries a plurality of bits, and
      output a plurality of second optical signals, each of the plurality of second optical signals including a corresponding one of a plurality of first optical components, each of the plurality of first optical components being delayed relative to the first optical signal, each of the plurality of second optical signals also including a corresponding one of a plurality of second optical components, at least one of the plurality of second optical components:
         having one of a phase or a polarization which is different than a phase or a polarization, respectively, of the first optical signal, or
         resulting from a combination or a splitting of portions of the first optical signal;
   a plurality of photodiodes configured to:
      receive the plurality of second optical signals, and
      generate a plurality of electrical signals in response thereto; and
   an electronic processor circuit configured to:
      receive the plurality of electrical signals, and
      output the plurality of bits based at least in part on:
         a first one of the plurality of electrical signals being scaled in accordance with a gain, or
         a combination of at least first and second ones of the plurality of electrical signals, which have been added, subtracted, or delayed relative to one another by a delay time period, where
            when the plurality of bits are output based at least in part on the first one of the plurality of electrical signals being scaled in accordance with the gain, the electronic processor circuit adjusts the gain in accordance with a variation in the polarization of the first optical signal or a variation in a wavelength of the first optical signal, and
            when the plurality of bits are output based at least in part on the first and second ones of the plurality of electrical signals being delayed relative to one another by the delay time period, the electronic processor circuit adjusts the delay time period in accordance with the variation in the polarization of the first optical signal or the variation in a wavelength of the first optical signal.

2. The receiver of claim 1, where the first optical signal comprises a ten gigabits per second (G/s) data signal.

3. The receiver of claim 1, where the electronic processor circuit further:
   determines an error signal associated with the plurality of electrical signals;
   modifies the plurality of electrical signals until the error signal is reduced; and
   generates the plurality of bits based on the modified plurality of electrical signals.

4. The receiver of claim 3, where the electronic processor circuit uses a least-mean squares (LMS) algorithm to modify the plurality of electrical signals until the error signal is reduced.

5. The receiver of claim 1, where the optical processor circuit comprises a differential quadrature phase-shift keying (DQPSK) modulation format demultiplexer and demodulator.

6. The receiver of claim 1, where the optical processor circuit comprises one of:
   a differential phase-shift keying (DPSK) modulation format demultiplexer and demodulator; or
   a quadrature amplitude modulation (QAM) format demultiplexer and demodulator.

7. The receiver of claim 1, where the electronic processor circuit comprises a multiple-input, multiple-output (MIMO) signal processor circuit.

8. The receiver of claim 7, where the multiple-input, multiple-output (MIMO) signal processor circuit comprises an eight input, four output (MIMO) signal processor circuit.

9. The receiver of claim 7, where the multiple-input, multiple-output (MIMO) signal processor circuit comprises a six input, four output (MIMO) signal processor circuit.

10. The communication system of claim 1, where the optical processor circuit comprises a differential quadrature phase-shift keying (DQPSK) modulation format demultiplexer and demodulator.

11. The communication system of claim 1, where the optical processor circuit comprises one of:
    a differential phase-shift keying (DPSK) modulation format demultiplexer and demodulator; or
    a quadrature amplitude modulation (QAM) format demultiplexer and demodulator.

12. The communication system of claim 1, where the electronic processor circuit comprises a multiple-input, multiple-output (MIMO) signal processor circuit.

13. The communication system of claim 12, where the multiple-input, multiple-output (MIMO) signal processor circuit comprises an eight input, four output (MIMO) signal processor circuit.

14. The communication system of claim 12, where the multiple-input, multiple-output (MIMO) signal processor circuit comprises a six input, four output (MIMO) signal processor circuit.

15. A communication system, comprising:
    a transmitter configured to output a first optical signal, such that one of a phase, polarization, amplitude, or difference in the phase of the first optical signal is modulated in accordance with a plurality of bits; and
    a receiver including:
       an optical processor circuit configured to:
          receive a first optical signal, which carries a plurality of bits, and output a plurality of second optical signals, each of the plurality of second optical signals including a corresponding one of a plurality of first optical components, each of the plurality of first optical components being delayed relative to the first optical signal, each of the plurality of second optical signals also including a corresponding one of a plurality of second optical components, at least one of the plurality of second optical components:
  having one of a phase or a polarization which is different than a phase or a polarization, respectively, of the first optical signal, or
  resulting from a combination or a splitting of portions of the first optical signal,
a plurality of photodiodes configured to:
  receive the plurality of second optical signals, and
  generate a plurality of electrical signals in response thereto, and
an electronic processor circuit configured to:
  receive the plurality of electrical signals, and
  output the plurality of bits based at least in part on:
    a first one of the plurality of electrical signals being scaled in accordance with a gain, or
    a combination of at least first and second ones of the plurality of electrical signals, which have been added, subtracted, or delayed relative to one another by a delay time period, where
      when the plurality of bits are output based at least in part on the first one of the plurality of electrical signals being scaled in accordance with the gain, the electronic processor circuit adjusts the gain in accordance with a variation in the polarization of the first optical signal or a variation in a wavelength of the first optical signal, and
      when the plurality of bits are output based at least in part on the first and second ones of the plurality of electrical signals being delayed relative to one another by the delay time period, the electronic processor circuit adjusts the delay time period in accordance with the variation in the polarization of the first optical signal or the variation in a wavelength of the first optical signal.

16. The communication system of claim 15, where the first optical signal comprises a ten gigabits per second (G/s) data signal.

17. The communication system of claim 15, where the electronic processor circuit further:
  determines an error signal associated with the plurality of electrical signals;
  modifies the plurality of electrical signals until the error signal is reduced; and
  generates the plurality of bits based on the modified plurality of electrical signals.

18. The communication system of claim 17, where the electronic processor circuit uses a least-mean squares (LMS) algorithm to modify the plurality of electrical signals until the error signal is reduced.

19. A method, comprising:
  receiving a first optical signal, which carries a plurality of bits;
  outputting a plurality of second optical signals, each of the plurality of second optical signals including a corresponding one of a plurality of first optical components, each of the plurality of first optical components being delayed relative to the first optical signal, each of the plurality of second optical signals also including a corresponding one of a plurality of second optical components, at least one of the plurality of second optical components:
    having one of a phase or a polarization which is different than a phase or a polarization, respectively, of the first optical signal, or
    resulting from a combination or a splitting of portions of the first optical signal;
  generating a plurality of electrical signals based on the plurality of second optical signals; and
  outputting the plurality of bits based at least in part on:
    a first one of the plurality of electrical signals being scaled in accordance with a gain, or
    a combination of at least first and second ones of the plurality of electrical signals, which have been added, subtracted, or delayed relative to one another by a delay time period, where
      when the plurality of bits are output based at least in part on the first one of the plurality of electrical signals being scaled in accordance with the gain, the electronic processor circuit adjusts the gain in accordance with a variation in the polarization of the first optical signal or a variation in a wavelength of the first optical signal, and
      when the plurality of bits are output based at least in part on the first and second ones of the plurality of electrical signals being delayed relative to one another by the delay time period, the electronic processor circuit adjusts the delay time period in accordance with the variation in the polarization of the first optical signal or the variation in a wavelength of the first optical signal.

20. The method of claim 19, where the first optical signal comprises a ten gigabits per second (G/s) data signal.

21. The method of claim 19, further comprising:
  determining an error signal associated with the plurality of electrical signals;
  modifying the plurality of electrical signals until the error signal is reduced; and
  generating the plurality of bits based on the modified plurality of electrical signals.

22. The method of claim 21, where modifying the plurality of electrical signals comprises:
  using a least-mean squares (LMS) algorithm to modify the plurality of electrical signals until the error signal is reduced.

23. The method of claim 19, where receiving a first optical signal comprises:
  receiving the first optical signal with one of a differential quadrature phase-shift keying (DQPSK) modulation format demultiplexer and demodulator, a differential phase-shift keying (DPSK) modulation format demultiplexer and demodulator, or a quadrature amplitude modulation (QAM) format demultiplexer and demodulator.

24. The method of claim 19, where generating a plurality of electrical signals comprises:
  generating the plurality of electrical signals with a multiple-input, multiple-output (MIMO) signal processor circuit.

25. The method of claim 24, where the multiple-input, multiple-output (MIMO) signal processor circuit comprises an eight input, four output (MIMO) signal processor circuit.

* * * * *